United States Patent
Kurian et al.

(10) Patent No.: US 10,528,929 B2
(45) Date of Patent: Jan. 7, 2020

(54) COMPUTER TERMINAL HAVING A DETACHABLE ITEM TRANSFER MECHANISM FOR DISPENSING AND COLLECTING ITEMS

(71) Applicant: Bank of America Corporation, Charlotte, NC (US)

(72) Inventors: Manu Jacob Kurian, Dallas, TX (US); Joseph Benjamin Castinado, North Glenn, CO (US)

(73) Assignee: Bank of America Corporation, Charlotte, NC (US)

(*) Notice: Subject to any disclaimer, the term of this patent is extended or adjusted under 35 U.S.C. 154(b) by 553 days.

(21) Appl. No.: 15/365,443

(22) Filed: Nov. 30, 2016

(65) Prior Publication Data

US 2018/0150812 A1    May 31, 2018

(51) Int. Cl.
| | |
|---|---|
| G06Q 40/00 | (2012.01) |
| G06Q 20/10 | (2012.01) |
| G06Q 20/40 | (2012.01) |
| G07F 19/00 | (2006.01) |
| G06F 3/00 | (2006.01) |
| G07G 1/00 | (2006.01) |
| G06Q 20/20 | (2012.01) |
| G06Q 20/32 | (2012.01) |

(52) U.S. Cl.
CPC ........... *G06Q 20/1085* (2013.01); *G06F 3/00* (2013.01); *G06Q 20/20* (2013.01); *G06Q 20/32* (2013.01); *G06Q 20/40145* (2013.01); *G07F 19/203* (2013.01); *G07G 1/0018* (2013.01)

(58) Field of Classification Search
CPC .... G07F 19/20; G07F 19/201; G06Q 20/1085
USPC ........................................................ 235/379
See application file for complete search history.

(56) References Cited

U.S. PATENT DOCUMENTS

| | | |
|---|---|---|
| 2,912,066 A | 11/1959 | Ellithorpe |
| 5,993,216 A | 11/1999 | Stogner et al. |
| 6,081,792 A | 6/2000 | Cucinotta et al. |
| 6,176,423 B1 | 1/2001 | Egami |
| 6,262,843 B1 | 7/2001 | Marx |
| 6,298,603 B1 | 10/2001 | Diaz |
| 6,494,363 B1 | 12/2002 | Roger et al. |
| 6,543,684 B1 | 4/2003 | White et al. |
| D492,085 S | 6/2004 | Korte et al. |
| 6,871,288 B2 | 3/2005 | Russikoff |
| 7,013,469 B2 | 3/2006 | Smith et al. |

(Continued)

*Primary Examiner* — Ahshik Kim
(74) *Attorney, Agent, or Firm* — Michael A. Springs; Moore & Van Allen PLLC; Peter B. Stewart

(57) ABSTRACT

A computer terminal typically includes a detachable item transfer mechanism and a docking station for receiving the detachable item transfer mechanism. The item transfer mechanism typically includes a housing defining a cavity and an opening to the cavity. The item transfer mechanism also typically includes a movable cover and a locking mechanism that is configured to secure movable cover over the opening. The locking mechanism is also typically configured to disengage the movable cover in response to a user providing authentication credentials or receiving an unlock command from the computer terminal. The computer terminal is typically configured to retrieve, via the docking station, a first item from the cavity of the item transfer mechanism and dispense, via the docking station, a second item into the cavity of the item transfer mechanism.

20 Claims, 14 Drawing Sheets

(56) References Cited

U.S. PATENT DOCUMENTS

| | | |
|---|---|---|
| 7,058,897 B2 | 6/2006 | Matsuda |
| 7,195,153 B1 | 3/2007 | Green et al. |
| 7,314,161 B1 | 1/2008 | Korte et al. |
| 7,726,557 B2 | 6/2010 | Bosch et al. |
| 7,866,544 B1 | 1/2011 | Block et al. |
| 7,873,573 B2 | 1/2011 | Realini |
| 8,037,299 B2 | 10/2011 | Becker Hof |
| 8,162,207 B2 | 4/2012 | Bosch et al. |
| 8,249,965 B2 | 8/2012 | Tumminaro |
| 8,332,321 B2 | 12/2012 | Bosch et al. |
| 8,333,321 B2 | 12/2012 | Gressel et al. |
| 8,499,494 B2 | 8/2013 | Robert, Jr. |
| 8,543,973 B2 | 9/2013 | Nguyen et al. |
| 8,630,617 B2 | 1/2014 | Raleigh |
| 8,762,274 B2 | 6/2014 | Bosch et al. |
| 8,818,833 B2 | 8/2014 | Druyan et al. |
| 8,868,455 B2 | 10/2014 | Raleigh et al. |
| 9,137,701 B2 | 9/2015 | Raleigh et al. |
| 9,324,002 B2 | 4/2016 | Ryan et al. |
| 9,604,563 B1 | 3/2017 | Wilson, II et al. |
| 9,647,918 B2 | 5/2017 | Raleigh et al. |
| 9,674,731 B2 | 6/2017 | Raleigh et al. |
| 9,710,804 B2 | 7/2017 | Zhou et al. |
| 9,898,901 B1* | 2/2018 | Kurian .................. H04W 12/02 |
| 9,980,146 B2 | 5/2018 | Raleigh et al. |
| 10,057,775 B2 | 8/2018 | Raleigh et al. |
| 2002/0180696 A1 | 12/2002 | Maritzen et al. |
| 2004/0262383 A1 | 12/2004 | Zielinski |
| 2007/0131757 A1 | 6/2007 | Hamilton et al. |
| 2008/0087720 A1* | 4/2008 | Levitov .............. G06Q 20/4014 235/379 |
| 2008/0275768 A1 | 11/2008 | Berman et al. |
| 2010/0126805 A1* | 5/2010 | Oh .......................... G07F 19/20 186/37 |
| 2010/0180018 A1 | 7/2010 | Cacheria, III et al. |
| 2011/0153115 A1 | 6/2011 | Inderrieden et al. |
| 2011/0174200 A1 | 7/2011 | Bartel |
| 2012/0067946 A1 | 3/2012 | Johnston |
| 2013/0086465 A1 | 4/2013 | Boudville |
| 2013/0232064 A1* | 9/2013 | Bosch .................. G06Q 10/087 705/43 |
| 2014/0121830 A1 | 5/2014 | Gromley et al. |
| 2015/0179025 A1 | 6/2015 | Cowell |
| 2017/0124814 A1* | 5/2017 | Swaine ................. G07F 19/203 |

* cited by examiner

COMPUTER TERMINAL HAVING A DETACHABLE ITEM TRANSFER MECHANISM FOR DISPENSING AND COLLECTING ITEMS

FIELD OF THE INVENTION

The present invention is directed to a computer terminal for providing improved privacy and security to users located in a vehicle. The computer terminal typically includes a detachable item transfer mechanism and a docking station for receiving the detachable item transfer mechanism. The item transfer mechanism typically includes a housing defining a cavity and an opening to the cavity. The item transfer mechanism also typically includes a movable cover and a locking mechanism that is configured to secure movable cover over the opening. The locking mechanism is also typically configured to disengage the movable cover in response to a user providing authentication credentials or receiving an unlock command from the computer terminal. The computer terminal is typically configured to retrieve a first item from the cavity of the item transfer mechanism and dispense a second item into the cavity of the item transfer mechanism.

BACKGROUND

Computer terminals are commonly used by individuals to perform a variety of activities. Computer terminals are often located in public spaces. Therefore, a needs exists for improved privacy for individuals using computer terminals located in public spaces.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for computer terminal having a detachable item transfer mechanism for dispensing and collecting items. Particularly, embodiments of the present invention are directed to a computer terminal located in an environment, comprising: a display; a detachable item transfer mechanism; and a docking station configured for receiving the detachable item transfer mechanism. The detachable inter transfer mechanism comprises: a housing, the housing defining a cavity and an opening to the cavity; a movable cover movably attached to the housing, the movable cover being movable between a closed position and an open position, the movable cover being configured to cover the opening to the cavity when the movable cover is in the closed position; and a locking mechanism, the locking mechanism being configured to engage the movable cover to thereby secure the movable cover in the closed position, the locking mechanism being further configured to disengage the movable cover to thereby permit the movable cover to be moved to the open position in response to (i) a user providing authentication credentials or (ii) receiving an unlock command from the computer terminal. The computer terminal further comprises a memory; a communication interface; a processor; and a terminal application stored in the memory, executable by the processor, and configured for: initiating an interactive session with the user; during the interactive session, determining that the detachable item transfer mechanism is positioned in the docking station; and in response to determining that the detachable item transfer mechanism is positioned in the docking station, (i) retrieving, via the docking station, a first item from the cavity of the detachable item transfer mechanism or (ii) dispensing, via the docking station, a second item into the cavity of the detachable item transfer mechanism.

In one embodiment, or in combination with the previous embodiment, the terminal application is configured for: receiving a request from a mobile device of the user to initiate the interactive session; in response to receiving the request from the mobile device, establishing, via the communication interface, a secure communication channel with the mobile device and initiating the interactive session; during the interactive session, receiving an interactive command over the secure communication channel from the mobile device; and in response to receiving the interactive command over the secure communication channel from the mobile device, completing one or more activities.

In one embodiment, or in combination with any of the previous embodiments, wherein the terminal application is configured for: monitoring one or more parameters of the environment; and transmitting data associated with the one or more parameters of the environment to the mobile device over the secure communication channel.

In one embodiment, or in combination with any of the previous embodiments, wherein the terminal application is configured for: receiving a request from a computer system of the vehicle to initiate the interactive session; in response to receiving the request from the computer system of the vehicle, establishing, via the communication interface, a secure communication channel with the computer system of the vehicle and initiating the interactive session; during the interactive session, receiving an interactive command over the secure communication channel from the computer system of the vehicle; and in response to receiving the interactive command over the secure communication channel from the computer system of the vehicle, completing one or more activities.

In one embodiment, or in combination with any of the previous embodiments, the terminal application is configured for: monitoring one or more parameters of the environment; and transmitting data associated with the one or more parameters of the environment to the computer system of the vehicle over the secure communication channel.

In one embodiment, or in combination with any of the previous embodiments, the detachable item transfer mechanism comprises a user interface, the detachable item transfer mechanism being configured to receive the authentication credentials from the user via the user interface.

In one embodiment, or in combination with any of the previous embodiments, the detachable item transfer mechanism comprises a second communication interface, the user interface being configured to receive interactive commands from the user; wherein the terminal application is configured for: establishing, via the communication interface, a secure communication channel with the second communication interface of the detachable item transfer mechanism; receiving an interactive command over the secure communication channel from the detachable item transfer mechanism; and in response to receiving the interactive command over the secure communication channel from the detachable item transfer mechanism, completing one or more activities.

In one embodiment, or in combination with any of the previous embodiments, completing the one or more activities comprises initiating the interactive session.

In one embodiment, or in combination with any of the previous embodiments, the user interface of the detachable item transfer mechanism comprises a second display, the detachable item transfer mechanism being configured to display session information on the second display during the interactive session.

In one embodiment, or in combination with any of the previous embodiments, the terminal application is configured for: monitoring one or more parameters of the environment; and transmitting data associated with the one or more parameters of the environment to the detachable item transfer mechanism over the secure communication channel; and the detachable item transfer mechanism is configured to display the data associated with the one or more parameters of the environment on the second display.

In one embodiment, or in combination with any of the previous embodiments, the computer terminal comprises one or more sensors for monitoring the one or more parameters of the environment.

In one embodiment, or in combination with any of the previous embodiments, the detachable item transfer mechanism comprises a second communication interface; wherein the terminal application is configured for: establishing, via the communication interface, a secure communication channel with the second communication interface of the detachable item transfer mechanism; and transmitting the unlock command over the secure communication to the detachable item transfer mechanism.

In one embodiment, or in combination with any of the previous embodiments, the docking station is configured for dispensing one or more items into the cavity of detachable item transfer mechanism.

In one embodiment, or in combination with any of the previous embodiments, the docking station is configured for retrieving one or more items from the cavity of the detachable item transfer mechanism.

In one embodiment, or in combination with any of the previous embodiments, the computer terminal is an automated teller machine.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
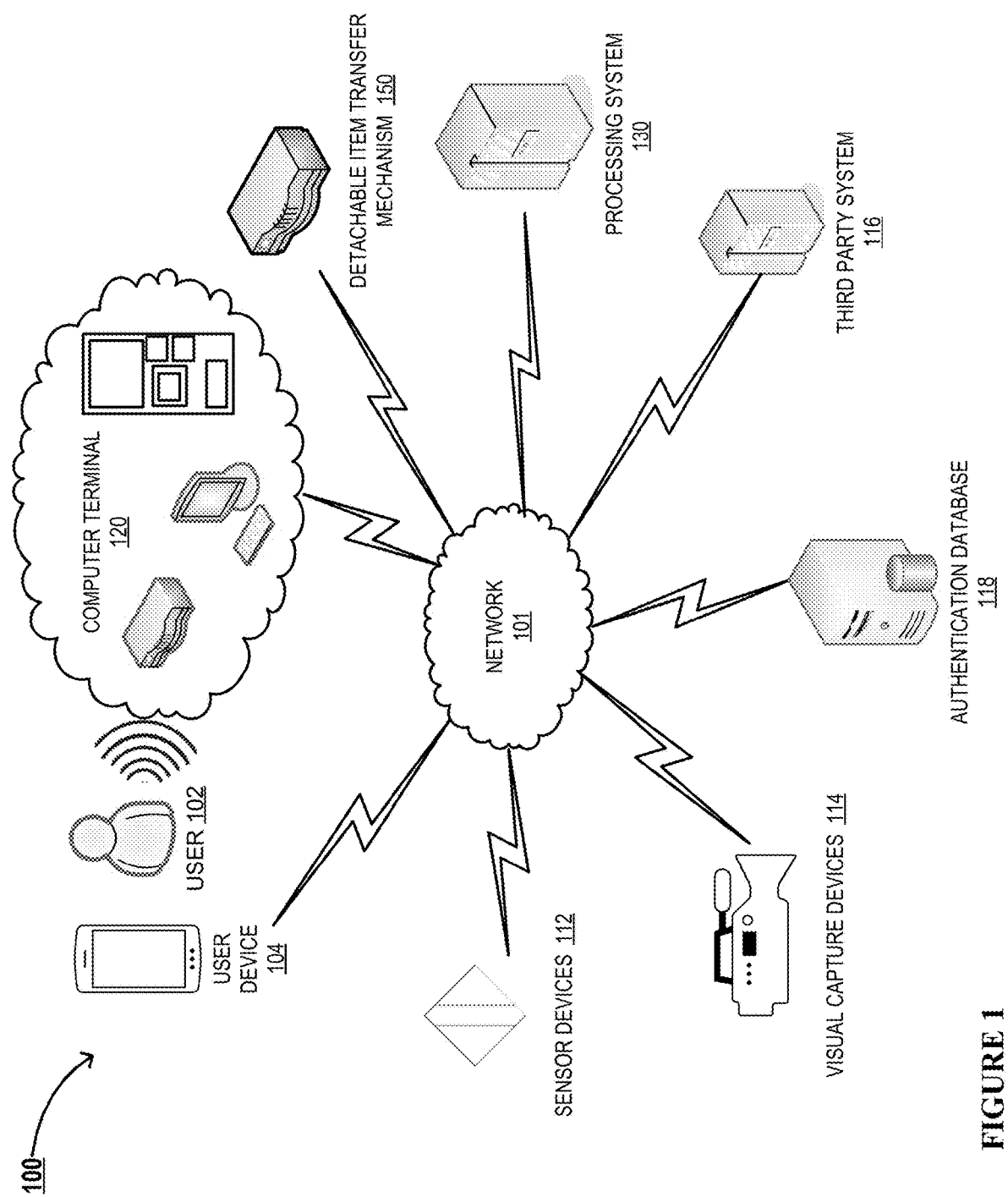
FIG. 1 illustrates a block network architecture diagram illustrating a system environment 100 for providing physical security at computer terminals, in accordance with an embodiment of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution, establishment or enterprise, associated with a network connected resource transfer platform, and particularly geolocation systems and devices. As such, the entity may be any institution, group, association, financial institution, merchant, establishment, company, union, authority or the like. Typically, the entity is associated with one or more computer terminals. Typically, the entity owns the computer terminals, operates computer terminals, provides the computer terminal devices, facilitates services associated with the computer terminals, and/or is otherwise associated with the computer terminals.

As described herein, a "user" is an individual associated with an entity. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with a computer terminal, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and computer terminals described herein. In other embodiments, a user may be a system or an entity performing one or more tasks described herein.

The term "computer terminal" as used herein may refer to one or more electronic devices that facilitate one or more user activities or transactions. Typically, a computer terminal is configured to facilitate performance of one or more user activities by establishing an "interactive session" between a user and the computer terminal. As such, the terms "user activity" or "user transaction" or simply "activity" may refer to financial or non-financial activities, tasks, events or actions. In some embodiments a computer terminal refers to one or more devices that facilitate execution of financial transactions or activities. In this regard, the computer terminals may be Automated Teller Machines (ATMs), Point of sale (POS) devices, vending machines, checkout registers, ticket vending machines, automated retail transaction devices, banking terminals in a financial institution and other computing devices that involve financial user activities or transactions in one form or another, or may comprise technology elements and/or functionality of one or more aforementioned devices. In some embodiments the computer terminal refers to devices that facilitate execution of non-financial user activities or transactions, for example, check-in terminals for various industries, for example: hospitality, travel, healthcare and the like, information kiosks and other computer terminals that do not involve a user performing a financial transaction via the computer terminal. In some embodiments the computer terminals enable execution of both financial and non-financial transactions/activities. That said, computer terminals may also refer to portable devices that facilitate financial and/or non-financial transactions, such as personal computers, laptop computers, tablet computers, smartphones, wearable devices, personal digital assistants (PDAs), and other computing devices. In some embodiments, the computer terminals may be owned, operated and/or otherwise associated entities and are installed at suitable locations, such that the user can travel to the location of the computer terminal to perform user activities or execute transactions. In some embodiments, the computer terminals may be owned, operated and/or otherwise associated with the user. In embodiments described herein, performing a user activity or transaction may refer to the initiation, stages during the processing, or completion of a transaction.

A "vehicle" or a "user vehicle" as used herein refers to transportation vehicles and particularly to an automobile such as a car, light truck, truck, bus, or another motor vehicle. In some embodiments, the vehicle is a car. Here, the vehicle may comprise a vehicle body and one or more portals on the vehicle body (such as windows, doors, and the like). In some embodiments, the vehicle is a motorcycle.

Typically, the user may provide authentication credentials for conducting user activities or transactions at the computer terminal. In some embodiments, computer terminals require the user to perform one or more authentication steps based on the level of authorization desired for a particular user activity or transaction. In this regard, for example, the user may slide cards with magnetic strips, provide one or more account numbers, user identifiers or userID and the like and further may provide the accompanying personal identification numbers (PIN), passwords, CVV numbers and the like associated with the individual computer terminal and/or the individual card/account provided for authentication.

Many of the embodiments and example implementations thereof described herein are directed toward solving a pervasive technical problem, namely that computer terminals often provide inadequate privacy and security to users. In this regard, many computer terminals, such as automated teller machines, are located in public spaces. Accordingly, other individuals in those spaces may be able to perceive information displayed on a display of a computer terminal or view specific interactions between the computer terminal and a user. For example, if the computer terminal is an automated teller machine (ATM), individual in the proximity of the ATM may be able to perceive account information displayed on the ATM or ascertain that an individual has withdrawn cash from the ATM. In addition, many of these computer terminals are configured to allow a user located in a vehicle (e.g., a car or other motor vehicle) to interact with such computer terminals. However, the user typically must expose themselves to their immediate environment (e.g., by rolling down a car window) before the user can interact with the computer terminal. Thus, interacting with the computer terminal reduces the user's security that would otherwise be provided by the vehicle.

Another problem associated with the use of computer terminals is that users of such computer terminals focus their attention on a display or other interface of a computer terminal, thereby reducing users' awareness of their surroundings. For example, the user of an ATM may focus their attention on a display of the ATM, and so the user may be less likely to perceive that another individual is located behind the user and close enough to view account information on the display of the ATM.

In order to solve these technical problems, in one aspect, the present invention relates to a computer terminal that provides increased privacy and security to a user located in a vehicle. In one embodiment, a computer terminal includes a retractable conduit that includes a proximal end, a distal end, and a barrier between the proximal end and the distal end. The distal end is typically configured to engage a portal (e.g., window) of a vehicle positioned proximate to the computer terminal. Once the distal end engages the vehicle's portal, the barrier physically separates the user from their immediate environment while the user interacts with the computer terminal, thereby providing increased privacy and security to the user.

In another embodiment, a computer terminal includes a detachable item transfer mechanism. The detachable item transfer mechanism typically includes a secure cavity in which the computer terminal may dispense one or more items for retrieval by a user; however, the secure cavity typically remains locked until the user provides authentication credentials. For example, if the computer terminal is an ATM, the ATM may dispense cash into the detachable item transfer mechanism. The user may then retrieve the detachable item transfer mechanism and place the detachable item transfer mechanism in the user's vehicle. Thereafter, the user may provide authentication credentials (e.g., a 4-digit numeric code) to an interface device of the detachable item transfer mechanism in order to unlock the secure cavity and collect the cash. In addition to the computer terminal dispensing items into the secure cavity, the user may place items (e.g., cash and/or checks) that the user wishes to deposit with the computer terminal in the secure cavity. Accordingly, although the user may be exposed to their environment when retrieving the detachable item transfer mechanism or returning the detachable item transfer mechanism to the computer terminal, the user may interact with detachable item transfer mechanism from the security of their vehicle, thereby allowing the user to retrieve items from the computer terminal or depositing items with the computer terminal without directly exposing such items to the environment outside the vehicle.

In either embodiment, the user may use their mobile device or the vehicle's computer system to interact with computer terminal, instead of using other interface devices (e.g., a display, keypad, or the like) of the computer terminal. For example, the user may use their mobile device, instead of the computer terminal's keypad, to provide authentication credentials to the computer terminal. In addition, information related to the interaction between the user and computer terminal be transmitted to and displayed on the mobile device's display, instead of being displayed on the display of the computer terminal. Thus, the user may privately and securely interact with the computer terminal from the security their vehicle.

Also in either embodiment, the computer terminal may be configured to monitor parameters of the environment in which the computer terminal is located (e.g., via one or more sensors). Information about the environment (e.g., a real-time diagram of the environment immediately proximate to the computer terminal) may be displayed on the computer terminal's display (or on the display of the user's mobile device or a display located in the vehicle). By providing environmental information, the user may maintain awareness of their surroundings even while interacting with the computer terminal. These functions and features will be described in detail henceforth with respect to FIGS. 1 to 13.

In general, embodiments of the present invention relate to electronic devices, systems, apparatuses, methods and computer program products for providing physical security for users at computer terminals. As discussed above, in some embodiments of the inventions, a computer terminal is provided that has been equipped with security modules such as a retractable conduit and/or a detachable item transfer mechanism. In this regard, in some embodiments, the security module is a built-in feature of the computer terminal. In other embodiments, a stand-alone security module is provided that is detachable and is configured to be operatively coupled to a computer terminal.

Referring to FIG. 1, a block diagram illustrating a system environment 100 configured for providing physical security at computer terminals, is illustrated, in accordance with some embodiments of the invention. Specifically, computer terminal of the system environment 100 is configured to create a secure physical connection between a computer terminal and a vehicle 108 (illustrated in FIGS. 6 and 7) and/or provide a detachable item transfer mechanism for dispensing and collecting items. As illustrated, the system environment 100 may comprise a computer terminal 120, in operative communication with one or more user devices 104 associated with a user 102, a processing system 130, one or more sensor devices 112, one or more visual capture devices 114, an authentication database 118, a third party system 116, a detachable item transfer mechanism 150, and/or other systems/devices not illustrated herein, via a network 101. As such, the computer terminal 120 is configured such that the user 102 may perform one or more user activities or transactions by utilizing the computer terminal directly (for example, by physically operating the computer terminal 120 and its interfaces, using input/output devices of the terminal 120, using audio commands, using physical gestures, and the like) and/or via communication between the user device 104 and the terminal 120 (for example, by establishing operative communication channels between the user device 104 and the terminal 120 via a wireless network and interacting with the terminal 120 via the devices and interfaces of the user device 104).

Typically, the processing system 130, the detachable item transfer mechanism 150, and the authentication database 118 are in electronic communication with the computer terminal 120, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the computer terminal 120). In this regard, the wireless communication channel may further comprise near field communication (NFC), communication via radio waves, communication through the internet, communication via electromagnetic waves and the like.

As discussed previously, the computer terminal 120 is configured to facilitate performance of user activities, and is configured to provide real-time interactive sessions for the user 102. In some embodiments, the computer terminal 120 is an ATM 120*a* configured for facilitating user activities, while ensuring the security and privacy of the user. In some embodiments, the computer terminal 120 is a point of sale terminal 120*b*, a computing device 120*c*, a vending machine, a kiosk, and/or another device that is configured to facilitate the user activity. The components of the computer terminal 120, its features and functions will be described in detail throughout this disclosure and with respect to FIG. 2, in particular.

In some embodiments, the computer terminal 120 receives signals, images and other data captured by the sensor devices 112 and/or the visual capture devices 114, during its execution of user activities. In this regard, in some embodiments, the computer terminal 120 communicates with, transmits instructions, and/or receives signals from the sensor devices 112 and the visual capture devices 114 directly, via the network 101, typically, in real-time. In some embodiments, the computer terminal 120 communicates with the sensor devices 112 and the visual capture devices 114 through the processing system 130, typically, in real-time. Analyzing the signals received from the sensor devices 112 and the visual capture devices 114 typically enables the computer terminal 120, the processing system 130, or the devices 112 and 114 themselves, to determine user location, determine trigger events, determine location of a vehicle, determine location of a portal of a vehicle, capture one or more parameters associated with the environment or physical location of the computer terminal 120, and the like.

In some embodiments, the sensor devices 112 are position sensors configured to determine the position and/or location of the user 120, other individuals, objects/devices, or entities. As such, the sensor devices 112 may determine an absolute position (for example, location/positioning coordinates) or a relative position (for example, with respect to the position of the terminal 120, with respect to position of the user or another individual, with respect to the sensor 112 itself or a predetermined object and the like) of the user, individual, vehicle, vehicle portal, or another object. Here, in some embodiments, the sensor devices 112 are proximity sensors that are configured to determine the presence of the user, vehicle, vehicle portal, or another object within a predetermined proximity area. These sensor devices 112 may be contact type sensors that determine the presence of the user or object based on contact, or non-contact type sensors that detect distant users or objects. Typically, the sensor devices 112 comprise a first transducer that is configured to convert electrical energy into a proximity signal (for example, an electromagnetic wave, a sound wave, and the like) that is broadcast in a predetermined proximity area. The incidence of the proximity signal on physical users or objects within the proximity area results in a return signal/wave that is captured by the sensor 112. The return signal/wave is then converted to an electric signal by a second transducer of the sensor. This electric signal may be analyzed, in real-time, by the sensor 112, the terminal 120, and/or the processing system 130, to determine the location of the user/vehicle/portal and/or track movement of the user/vehicle/portal. Here, the sensor 112 may be configured to perform modulation, demodulation, amplification and output switching of the proximity and return signals.

In some embodiments, the sensor is configured such that portals of vehicles return a distinct second return signal (for example, when the portal window of the vehicle has a glass window pulled up/closed), and/or no return signal (for example, when the portal window of the vehicle has an aperture comprising air when the glass window is lowered/opened), distinct from a first return signal returned by a metallic body of the vehicle. The system may then analyze the signals to identify the location of the portal within the vehicle, based on the distinct return signals. The different material properties of the vehicle body and the vehicle portal trigger distinct return signals that help the system/terminal identify the location of the portal. For example, properties of the materials such as electrical/magnetic conductivity (for example, employed by ultrasonic sensors, and inductive sensors), reflection, refraction and/or absorbance of light (for example, employed by light/optical sensors, infrared sensors, and visual/image capture devices), color (for example, employed by visual/image capture devices), are harnessed to identify the contours of the portal. In some embodiments, the visual capture devices 114 are configured to capture images of the vehicle. These images many then be analyzed to identify the portal of the vehicle.

For example, in some embodiments, the sensor devices 112 comprise ultrasonic sensors that are configured to transmit a proximity signal comprising sound waves (typically with frequencies above 18 kHz) and are further configured to receive a return signal in the form or an echo, which is then converted to an electric signal for analysis. As another example, in some embodiments, the sensor devices 112 comprise optical sensors or photoelectric sensors that are configured to transmit a proximity signal comprising electromagnetic waves, and specifically light waves (for example, infrared waves with frequencies in the range of about 600 GHz to 430 THz, such as pulsed infrared or visible red waves, laser waves in the visible or infrared frequency range, and the like) and are further configured to receive a return signal, either in the form of a reflection signal or interruption of the light proximity signal at receiver associated with the sensor 112, which is then converted to an electric signal for analysis. As yet another example, the sensor devices 112 comprise inductive proximity sensors and inductive position sensors for determining the presence and position, respectively, of users and objects, which generate an induction loop to thereby produce a proximity signal in the form or a magnetic field. The presence of users, vehicles or objects varies the current flowing through the loop which facilitates determination of presence of users or objects. In some instances, objects of different materials such as a first material of the vehicle body (for example, a metal or alloy) and a second material of the vehicle portal (for example, glass, plastic, or air) vary the current distinctly. Therefore, analysis of the variation in the current flow enables identification of the vehicle itself and/or location of the portal of the vehicle.

The visual capture devices 114 typically comprise cameras and other audio, video and image capture devices. These visual capture devices 114 are configured to capture images and/or video streams, typically in real-time, of a predetermined proximity area. The images and/or video streams may be analyzed by the computer terminal 120, the processing system 130 and/or the capture devices 114, to determine the presence and position of the user, other individuals or objects and their movement in the proximity area. Although described separately, it is understood that the visual capture devices 114 may be associated with the sensor devices 112. As such, sensors or sensor devices, as alluded to herein, may refer to the various sensor devices described herein and the visual/image capture devices described herein.

Furthermore, in some instances, the sensor devices are configured to identify a plurality of portals of a vehicle. The system (comprising the computer terminal 120 and/or the processing system 130) is configured determine a primary portal of the plurality of portals for performing the user activity, for example, based on analyzing the signals received from the sensor devices. The system may determine the primary portal of the plurality of portals based on determining that the user 102 is located proximate the primary portal in the vehicle, based on determining that a user device 104 in wireless communication with the terminal 120 is proximate the primary portal, based on receiving an indication from the user 102 via the user device 104 in wireless communication with the terminal 120, based on determining a gesture, a voice command, and the like, from the user 120, and/or based on identifying that the primary portal is the most proximate portal with respect to the computer terminal 120. Because the positions of the portals vary with the type and dimensions (for example, height) of the vehicle, in some embodiments, the system, using the sensor devices 112 or based on analyzing the feed received from the visual capture devices 114, is configured to determine a type of vehicle (for example, mini car, SUV, trucks, and the like) and/or dimensions of the vehicle (for example, vehicle height), and accordingly determine the one or more portals and/or the primary portal with increased efficiency, speed and accuracy.

As alluded to previously, the processing system 130 is in operative communication with the computer terminal 120. In some embodiments, processing system 130 is configured to transmit control instructions that are configured to cause the computer terminal 120, the user device 104, the detachable item transfer mechanism 150, the sensor device 112 and/or the visual capture devices 114 to perform at least a portion of the steps associated with one or more activities. The processing system 130 may be associated with the same entity as the computer terminal 120 or may be associated with another entity. The structure and components of the processing system 130 is described in detail with respect to FIG. 3. The computer terminal 120 may further communicate with the third part system 116 and/or the authentication database 118, either directly or via the processing system 130. The authentication database 118 may comprise authentication credentials associated with the user. The processing system 130 and/or the computer terminal 120 may retrieve the authentication credentials from the authentication database to authenticate the user prior to executing one or more user activities or transactions.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. As discussed previously, in some embodiments, the computer terminals 120 of the present invention are configured to establish operative communication channels with the user device 104 such that, the user 102 may perform one or more user activities, either entirely or in part, at the terminal 120 by interacting with the user device 104. In some embodiments, user device 104 refers to a computer system of the user vehicle 108. The user device 104 is described in detail with respect to FIG. 4.

As further illustrated by FIG. 1, the environment 100 may further comprise a detachable item transfer mechanism 150. The detachable item transfer mechanism 150 is typically in operative communication with the computer terminal 120, the processing system 130 and/or the user device 104, via suitable wireless communication channels of the network 101.

As alluded to previously, the detachable item transfer mechanism 150 typically includes a secure cavity in which the computer terminal 120 may dispense one or more items for retrieval by a user 102, and/or in which the user 102 may place one on more items for deposit into the computer terminal 120. The computer terminal 120 typically includes a docking station for receiving the detachable item transfer mechanism. The functions and features of the detachable item transfer mechanism 150 will be described in detail with respect to FIGS. 2, 5, and 10 to 12.

Figure 2:
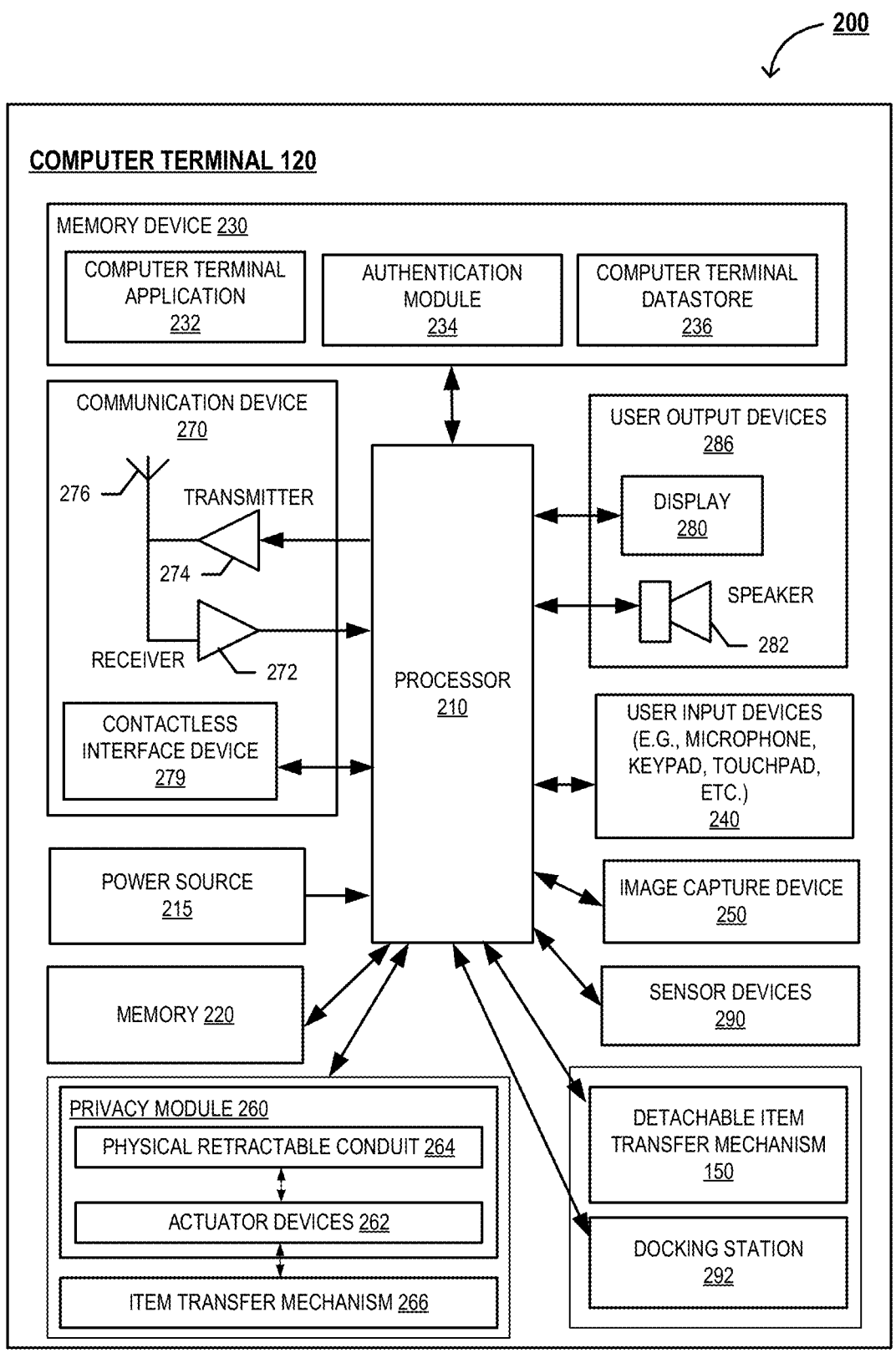
FIG. 2 illustrates a block diagram 200 of a computer terminal system, in accordance with an embodiment of the invention.

FIG. 2, illustrates a block diagram 200 of the computer terminal 120 system, in accordance with some embodiments of the invention. As discussed previously, the computer terminal 120 is configured to facilitate performance of user activities with increased security, and is configured to provide real-time interactive sessions for the user 102. The computer terminal 120 typically includes a processing device or a processor 210, memory device 230, storage memory 220 or datastore 220, and a communication device 270. As such, the computer terminal 120, and the processor 210 is particular, is configured to perform at least a portion of the steps of the embodiments described herein, either based on executing computer readable instructions stored in the memory device 230, by causing other devices and systems (such as the detachable item transfer mechanism 150, the user device 104, and the like) to perform one or more steps described herein, and/or based on receiving instructions, indications, or signals from other systems and devices such as the processing system 130, the user device 104, sensor devices 112, visual capture devices 114, the user 102, and/or other systems. In some embodiments, the processing system 130 is configured to transmit control instructions to, and cause the processor 210 of the computer terminal 120 to perform one or more steps of the embodiments presented herein. For example, the processing system 130 may detect a trigger event (for example, determining that the vehicle is proximate the computer terminal) and transmit an indication to the processor 210. In response to receiving the control signal from the system 130, the processor 210 may initiate a presentation of environment parameters.

The processor 210 may generally refer to a device or combination of devices having circuitry used for implementing the communication and/or logic functions of the computer terminal 120. For example, the processor 210 may include a control unit, a digital signal processor device, a microprocessor device, and various analog-to-digital converters, digital-to-analog converters, and other support circuits and/or combinations of the foregoing. Control and signal processing functions of the computer terminal 120 may be allocated between these processing devices according to their respective capabilities.

The computer terminal 120 may further include various components/devices in operative communication with and/or controlled by the processor 210, such as user output devices 286, user input devices 240, a network communication interface 279 (such as a contactless interface 279), a power source 215, and the like. Furthermore, in some embodiments, the processor 210 is operatively coupled to and is configured to control other components/devices of the computer terminal 120, such as an image capture device 250, sensor devices 290, a physical privacy module 260, and the like. These components and devices are described in detail below.

The memory device 230 and the storage memory 220 may generally refer to a device or combination of devices that store one or more forms of computer-readable media for storing data and/or computer-executable program code/instructions. In some embodiments, the storage memory 220 is integral with the memory device 230. In some embodiments, the memory device 230 comprises a non-transitory, computer readable storage medium. For example, the memory device 230 and/or the storage memory 220 may include any computer memory that provides an actual or virtual space to temporarily or permanently store data and/or commands provided to the processor 210 when it carries out its functions described herein.

As illustrated by FIG. 2, the memory device 230 typically comprises a computer terminal application 232 (also referred to as a terminal application), an authentication module 234, a computer terminal application datastore 236 stored therein. In some embodiments, the authentication module 234 is integral with the computer terminal application 232. In some embodiments, the computer terminal applications 232 and/or the authentication module 234 may be executable to initiate, perform, complete, and/or facilitate one or more portions of any embodiment described and/or contemplated herein, either independently or in response to receiving control instructions from the processing system 130. In some embodiments, the computer terminal application/module 232 comprises computer readable instructions stored in the memory device 230, which when executed by the processor 210, are configured to cause the processor 210 to perform one or more steps of the embodiments presented herein, and/or cause the processing device to transmit control instructions to other components of the terminal 120 and other devices/systems in the network 101 to cause them to perform the steps. Generally, the computer terminal application 232 is executable to receive activity instructions from the user and perform typical computer terminal functions in addition to the specific steps of the embodiments presented herein, as appreciated by those skilled in the art. The computer terminal application 232 may be coupled to a computer terminal application datastore 236 for storing application data as the user activity is being performed. The computer terminal application datastore 236 may store the application data temporarily for the predetermined duration of the execution of the activity (such as a memory buffer, or cache memory), or permanently.

The computer terminal 120 may require users to identify and/or authenticate themselves before the computer terminal 120 may initiate, perform, complete, and/or facilitate a user activity. For example, in some embodiments, the computer terminal 120 is configured (and/or the computer terminal application 232 is executable) to authenticate a computer terminal user based at least partially on a computer terminal debit card, smart card, token (e.g., USB token, etc.), username, password, PIN, biometric information, and/or one or more other credentials that the user presents to the computer terminal 120. Additionally or alternatively, in some embodiments, the computer terminal 120 is configured to authenticate a user by using one-, two-, or multi-factor authentication. For example, in some embodiments, the computer terminal 120 requires two-factor authentication, such that the user must provide a valid debit card and enter the correct PIN associated with the debit card in order to authenticate the user to the computer terminal 120. However, either alternatively or in addition to the aforementioned authentication features, the computer terminal 120 may require biometric authentication of the user 102 before initiating, performing, completing, and/or facilitating a user activity. In some embodiments, these authentication credentials are received at the computer terminal via input 240 and output 286 devices of the terminal 120. In some embodiments, the authentication credentials are received via a user interface of the user device 104. In some embodiments, the authentication credentials are received via an interface of the detachable item transfer mechanism 150.

In some embodiments, the authentication module 234 comprises computer readable instructions that when executed by the processor 210 cause the processing device to perform one or more functions and/or transmit control instructions to other components or devices (such as the user device 104, the detachable item transfer mechanism 150 and the like) to perform one or more authentication steps described herein. These authentication steps typically include requesting authentication credentials from the user via the user output devices 286 and/or via user interfaces/output devices of the user device 104 and/or the detachable item transfer mechanism 150 (for example, based on determining the desired authorization level for the user activity), activating pertinent sensors and devices for receipt of the credentials (sensor devices 290/image capture devices 250 for biometric credentials, card reader devices 240 for reading magnetic strips of the user's card(s), contact less interface device 279 for receiving authentication tokens from a user device via NFC channels, and the like), receiving authentication credentials, validating the credentials (for example based on retrieving user credentials from the datastore 236, memory 220, processing system 130 and/or database 118), and the like. That said, as shown, the processor 210, in turn, is operatively connected to and is also configured to control and cause the communication device 270, the memory device 230, and other components described herein to perform one or more functions, at least in part.

The communication device 270 may comprise a modem 271 (not illustrated), a receiver 272, a server 273 (not illustrated), a transmitter 274, transceiver, and/or another device for communicating with other devices and systems on the network 101. The communication device 270 may further comprise a contact, contactless, wireless and/or wired interface that is configured to establish communication between components of the computer terminal 120, between the computer terminal 120, particularly the processor 210, and other devices or systems, such as the processing system 130, the user device 104, the detachable item transfer mechanism 150, the authentication database 118, the third party system 116, and the like. In this regard, the communication interface 270 comprises a transmitter 274, a receiver 272, a broadcasting device 276 to transmit and receive signals from corresponding devices via a suitable transmission medium or a communication channel. In some embodiments, the computer terminal 120 is configured to be coupled/connected to other devices and systems via wired communication channels. In other embodiments, the computer terminal 120 is configured to be coupled/connected to other devices via a wireless channel. In this regard, the wireless communication channel may comprise near field communication (NFC), communication via radio waves, communication through the internet, communication via electromagnetic waves and the like. The communication device 270 may further comprise a contactless interface device 279 for establishing contactless communication with other devices, such as the user device 104. Here, the computer terminal 120 may include a transceiver, i.e., one or more antennas and and/or other electronic circuitry, devices, and software, for receiving data when a device is held close to or tapped at a suitable location of the computer terminal 120. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 may transmit and receive radio frequency signals, respectively, from the computer terminal 120 within a distance of up to approximately 25 cm, and from 0-20 cm, such as from 0-15 cm, and 0-10 cm, and the like. Specifically, the communication device may employ NFC channel features described above to operatively communicate with the detachable item transfer mechanism 150 and/or the user device 104.

Establishing the communication channels may also include signaling information in accordance with the air interface standard of the applicable cellular system of the wireless telephone network that may be part of the network 101. In this regard, the computer terminal 120 may be configured to operate with one or more air interface standards, communication protocols, modulation types, and access types. By way of illustration, the computer terminal 120 may be configured to operate in accordance with any of a number of first, second, third, and/or fourth-generation communication protocols and/or the like. For example, the computer terminal 120 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The computer terminal 120 may also be configured to operate in accordance with non-cellular communication mechanisms, such as via a wireless local area network (WLAN) or other communication/data networks The user interface of the computer terminal 120 may include user input devices 240 and user output devices 286, as illustrated by FIG. 2. The user interface of the computer terminal 120 is typically configured to facilitate the interactive sessions with the user. The user output devices 286 typically include a display 280 (e.g., a liquid crystal display, a touchscreen display, and/or the like) which is operatively coupled to the processor 210. In some embodiments, where the computer terminal 120 requests the user's signature (if needed), the display may also serve as a touchpad input device to input the user's signature via a stylus. Other output devices may include one or more LEDs or an audio speaker 282, both which may indicate to the user various steps of a user activity. The output devices 286 including the display 280 typically provide instructions and information to the user, regarding the user activity and steps associated with the user activity. The user interface 126 may include any number of user input devices 240 allowing the computer terminal 120 to transmit/receive data to/from the user 102, such as a keypad, keyboard, touch-screen, touchpad, microphone, mouse, joystick, other pointer device, button, soft key, and/or other input device(s). As such, in some embodiments, the user input devices 240 and/or the user output devices 286 are provided on an item transfer mechanism 266 of the computer terminal 120, in wireline and/or wireless communication with the processor 210. A printer that can print paper receipts may also be incorporated into the computer terminal 120.

In some embodiments, the user output device 286 is an interface headset (not illustrated), that is typically configured to be adorned by the user 102 and is operatively coupled to the terminal 120 via wireless communication channels. These wireless communication channels may be encrypted to ensure the security of user data. The interface headset is configured to provide augmented reality and virtual reality experiences to the user as the user is performing one or more user activities at the terminal.

As illustrated by FIG. 2, the computer terminal may further comprise an image capture device 250. The image capture device 250 typically comprises cameras and other audio, video and image capture devices. The image capture device 250 is configured to capture images and/or video streams, typically in real-time, of a predetermined proximity area in the vicinity of the computer terminal 120 location. The images and/or video streams may be analyzed by the computer terminal 120 to determine the presence and position of the user, other individuals or objects and their movement in the proximity area, to identify the user for authentication or facial recognition purposes, and the like. In some embodiments, the image capture device 250 may also be provided on the item transfer mechanism 266 of the computer terminal 120.

In some embodiments, the computer terminal further comprises sensor devices 290. In some embodiments, the processor 210 communicates with, transmits instructions, and/or receives signals from the sensor devices 290, in real-time for detecting the presence of the users or other individuals, detecting proximity of the vehicle, determining location of a portal of the vehicle, determining user location, capturing authentication credentials for the user, determining parameters associated with the user, determining trigger events, capturing one or more parameters associated with the environment or physical location of the computer terminal 120, and the like. These sensor devices 112 may be contact type sensors that determine the presence of the user or object based on contact, or non-contact type sensors that detect distant users or objects. In some embodiments, the sensor devices 290 of the computer terminal are similar to the sensor devices 112 described previously, for determining the absolute or relative position, location, and proximity of the user, other individuals, or predetermined objects (such as vehicles, and vehicle features like contours of portals/windows), within a predetermined proximity area. For example, the sensor devices 290 may comprise ultrasonic sensors, optical sensors, photoelectric sensors, capacitance sensors, inductive proximity/position sensors, visual capture devices (as described with respect to image/visual capture devices 114 and 250), and the associated transducers, transmitter and modulators, described in detail previously.

In some instances, the sensor devices 290 comprise biometric sensors for capturing parameters associated with the user, such as fingerprint scanners, voice recognition sensors, facial recognition sensors, heart rate sensors, user stress level sensors and the like. These biometric sensors 290 are configured to retrieve, receive, analyze and or validate biometric credentials associated with the user. In this regard, the biometric sensors 290 may comprise optical sensors, ultrasonic sensors, and/or capacitance sensors. The biometric sensors may further comprise radio frequency, thermal, pressure, piezo-resistive/piezoelectric, microelectromechanical sensors, and the like. In some embodiments, one or more of the sensor devices 290 described above are provided on the item transfer mechanism 266 of the computer terminal 120.

As further illustrated by FIG. 2, the computer terminal 120 comprises a privacy module 260. This privacy module 260 typically is a physical module that is integral with the computer terminal 120, in some embodiments. In other embodiments, the privacy module (also referred to as a "detachable module") is a stand-alone module that is detachable from, and configured to be operatively coupled to the computer terminal 120. In these embodiments, the detachable module may further comprise one or more sensor devices 290 and/or the item transfer mechanism 266. The privacy module 260 comprises one or more actuator devices 262 that are each operatively coupled to a physical retractable privacy conduit(s) 264. The actuator 262 is typically configured to extend and/or retract the retractable privacy conduit 264 to a predetermined length in response to receiving control instructions from the processor 210. The computer terminal 120, and particularly the processor 210, is configured to cause the extension of the retractable privacy conduit 264 by the actuator 262, to enable the user to securely and privately interact with the terminal 120, and cause retraction of the barrier at a predetermined time, for example, after completion of user activity. In some embodiments, the terminal 120 and/or the privacy module 260 comprises a sanitization mechanism (not illustrated) for sanitizing and/or disinfecting at least a portion of the privacy module 260 and/or the terminal 120, after the user activity, at the commencement of the user activity, before the retraction of the privacy conduit 264 and/or after/during the extension of the privacy conduit 264. In this regard, the sanitization mechanism may comprise a sanitizer and/or a disinfectant (for example, an alcohol based liquid or aerosol, a soap/water based solution/spray, and the like) and a dispensing apparatus for dispensing the sanitizer and/or disinfectant over the area of the terminal/module to be disinfected/cleaned.

Extension of the retractable privacy conduit 264 over a predetermined distance refers to linear displacement (extension/retraction) for a predetermined length, and/or angular displacement/rotation of the conduit with respect to a predetermined axis for a predetermined angle, as will be described in detail with respect to FIGS. 6 and 7. The actuator devices 262 are configured to convert a control signal (for example, an electronic signal received from the processor 210, or a tactile indication from the user or the user vehicle) into mechanical motion (physical extension/retraction of the retractable privacy conduit 264 over a predetermined distance).

In some embodiments, the actuator devices 262 are mechanical actuators or electro-mechanical actuators employing screw-bolt arrangements, gear arrangements, and the like, coupled to an electric motor for causing extension of the retractable privacy conduit 264 in linear/angular directions.

In some embodiments, the actuator devices 262 comprise hydraulic actuators generally having a cylinder (or fluid motor) with a piston arrangement, wherein the hydraulic fluid exerts pressure on the piston causing linear, rotary or oscillatory motion of the piston. The hydraulic actuators may be single acting or double acting. As such, the hydraulic actuator devices 262 may comprise hydraulic cylinders, position-sensing hydraulic cylinders, hydraulic motors, telescopic cylinders, and the like.

In some embodiments, the actuator devices 262 comprise pneumatic actuators employing compressed air/gases or vacuum for causing linear/angular extension of the retractable privacy conduit 264. In some instances, the pneumatic actuator devices 262 comprise a cylinder and piston/diaphragm arrangement, along with valve systems and the like.

In some embodiments, the actuator devices 262 comprise magnetic actuators generally employing magnetic fields/flux and utilizing forces (for example, Lorentz forces) generated when metallic objects interact with the magnetic field/flux to subsequently cause linear, rotary or oscillatory motion of the barrier.

In some embodiments, the actuator devices 262 comprise piezoelectric actuators and/or ultrasonic motors. This typically involves applying voltages to piezoelectric materials for causing expansion of the material, and in turn movement of the retractable privacy conduit 264. In some instances, piezoelectric actuators are employed in addition to the aforementioned actuators for short range motions, fine positioning or fine position correction of the retractable privacy conduit 264. That said, the actuator devices 262 may comprise one or more of mechanical actuators, electro-mechanical actuators, hydraulic actuators, motors, pneumatic actuators, magnetic actuators and piezoelectric actuators, based on the configuration of the barrier and the desired range and type of motion of the barrier.

The retractable privacy conduit 264 may be a single/contiguous element or may comprise multiple structures or parts. In the instances where the retractable privacy conduit 264 comprises multiple parts, in some embodiments each of these parts may be individually controllable by the actuators 262, while in other embodiments, movement of these parts may be effected by the movement of the conduit itself. In some embodiments, the retractable privacy conduit 264 may be a rigid barrier, while in other embodiments, the barrier may be at least partially flexible.

As alluded to previously, the retractable privacy conduit 264 of the computer terminal 120 provides increased privacy and security to a user located in a vehicle. Typically, the retractable privacy conduit 264 is a secure connector or channel that is configured to engage a portal of a vehicle to facilitate execution of user activities through the retractable privacy conduit 264. Typically, the retractable conduit 264 is extendable to an extended position to engage a vehicle 108, from a retracted position. Here, the actuator devices 262 are typically configured to linear extension (and/or retraction) of the retractable conduit 264, linear displacement for a predetermined length, and/or angular displacement/rotation of the conduit with respect to a predetermined axis for a predetermined angle. Typically, the retractable conduit 264 comprises a proximal end 264a, a distal end 264b, and a barrier 264c between the proximal end 264a and the distal end 264b. The barrier 264c typically encloses an interior volume of the conduit between the proximal and distal ends (264a, 264b), such that the barrier 264c physically separates the interior volume from the environment when engaged with a vehicle. The distal end 264b is typically configured to engage a portal of a vehicle 108 positioned proximate to the computer terminal. Once the distal end 264b engages the vehicle's portal, the barrier 264c physically separates the user from their immediate environment while the user interacts with the computer terminal, via the interior volume of the conduit, thereby providing increased privacy and security to the user. The functions and features of the retractable privacy conduit 264 will be described in detail with respect to FIGS. 6 and 7.

The retractable privacy conduit 264 typically comprises a frame configured for providing structural strength and support to the conduit 264, particularly in its extended position.

The frame is typically rigid and comprises one or more movable connectors, joints and linkages configured for extension and retraction of the conduit 264, via the actuators 262. As such, in some embodiments, the frame is constructed from materials that are rigid and strong enough to withstand buckling and flexure, when the frame is extended, while being light weight. The frame is typically accompanied by a conduit housing, configured for physically separating the interior volume of the conduit from the external surroundings. In some embodiments, the conduit housing is manufactured from flexible, resilient materials, such that the retractable privacy conduit 264 may be collapsed to a retracted state and extended to engage a vehicle. In some embodiments, the conduit housing is manufactured from rigid materials, for example, similar to those of the frame. As an example, the retractable privacy conduit 264 may comprise a rigid telescoping structure to enable extension and retraction of the conduit 264.

The retractable privacy conduit 264, and its frame and housing, may be manufactured out of suitable materials such as metals, alloys, plastics, composites, natural or synthetic materials, polymers and the like, or a combination thereof. Metallic materials may include suitable grades of stainless steel, carbon steels, other ferrous metals and alloys, aluminum and its alloys, tin, lead, and the like. Plastic materials may include polypropylene (PP), polycarbonate (PC), polyvinyl chloride, Low-density polyethylene (LDPE), Polystyrene (PS), Acrylonitrile butadiene styrene (ABS), and the like. Composite materials may include fiber-reinforced plastics, ceramic composites, metal matrices, metal composites, plywood, and the like. The retractable privacy conduit 264 may also be made of glass, acrylic or ceramic materials. The materials may be chosen for the specific application based on their strength, ductility/malleability, weight, rigidity/flexibility, durability, resistance to fatigue and creep, corrosion resistance, magnetic properties and the like. In some embodiments, the barrier materials may be chosen such that the barrier has a predetermined structural integrity and strength to provide safety to the user from the elements and/or a physical force/impact applied on the barrier. In some embodiments, the retractable privacy conduit 264 is opaque, while in other embodiments, the barrier may be translucent.

As further illustrated by FIG. 2, the computer terminal 120 may further comprise an item transfer mechanism 266 that is configured to dispense and/or receive items during an interactive session for execution of one or more user activities. The item transfer mechanism 266 is typically configured to extend and retract through the interior volume of the retractable privacy conduit 264, such that the barrier 264c of the conduit is configured to separate the item transfer mechanism 266 from the environment during the session. In some embodiments, the item transfer mechanism 266 is a part of the privacy module 260, while in other embodiments, the item transfer mechanism 266 is a separate component of the computer terminal 120. The functions and features of the item transfer mechanism 266 will be described in detail with respect to FIGS. 6 and 7.

As further illustrated by FIG. 2, the computer terminal 120 may further comprise a detachable item transfer mechanism 150. The detachable item transfer mechanism 150 typically includes a secure cavity into which the computer terminal 120 may dispense one or more items for retrieval by a user. The detachable item transfer mechanism 150 is typically operatively coupled to a docking station 292 of the computer terminal 120. The docking station 292 is typically configured for receiving the detachable item transfer mechanism 150, dispensing one or more items into the secure cavity, and/or retrieving one or more items placed in the secure cavity by the user, as will be described in detail with respect to FIGS. 11 and 12. The computer terminal 120 is typically configured to retrieve, via the docking station 292, a first item from the secure cavity of the item transfer mechanism 150 and dispense, via the docking station 292, a second item into the cavity of the item transfer mechanism.

In some embodiments, the detachable item transfer mechanism 150 is typically in operative communication with the computer terminal 120, the processing system 130 and/or the user device 104, via suitable wireless communication channels of the network 101, particularly when retrieved by the user. As such, in some embodiments, the computer terminal 120 in operative communication with the detachable item transfer mechanism 150 retracted from the terminal, is configured to receive user authentication credentials via the detachable item transfer mechanism 150, and in response to their successful validation, cause unlocking of a movable cover of the mechanism 150. In other embodiments, the detachable item transfer mechanism 150 may be configured to receive user authentication credentials, and unlock he movable cover in response to successful validation of the authentication credentials. The detachable item transfer mechanism 150 may by manufactured out of suitable materials described above, chosen based on their strength, durability and resistance to tampering. The detachable item transfer mechanism 150 is described in detail with respect to FIGS. 10 to 12.

Figure 3:
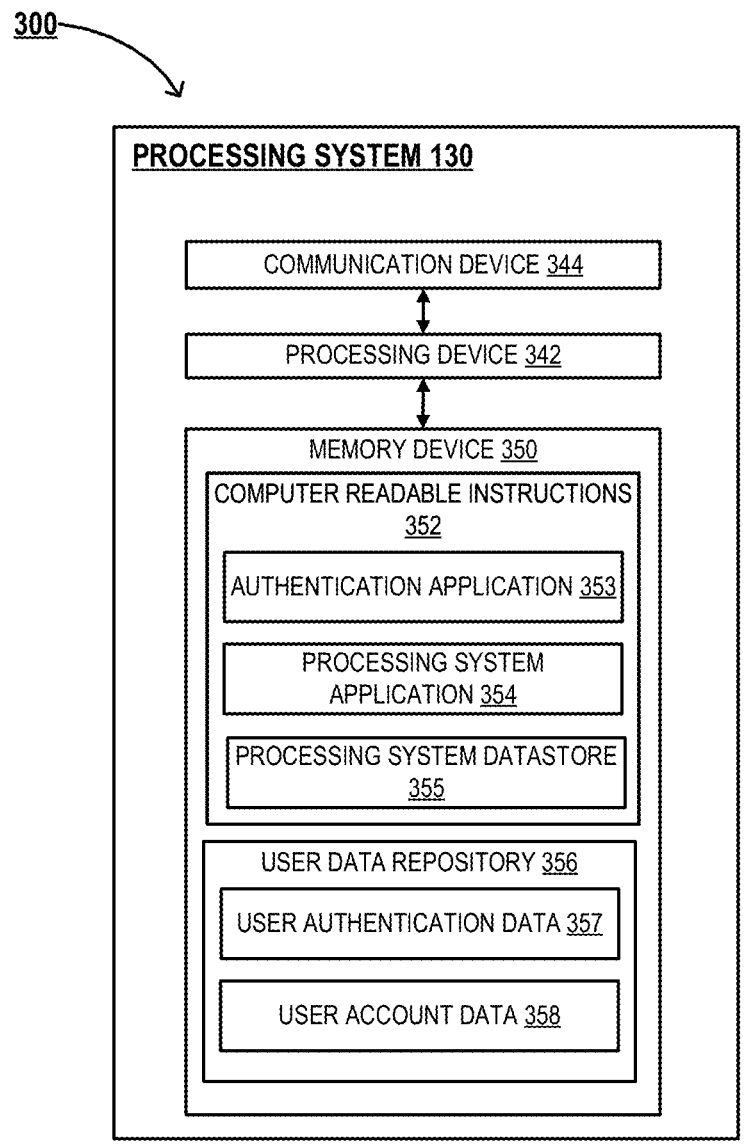
FIG. 3 illustrates a block diagram 300 of a processing system, in accordance with an embodiment of the invention.

FIG. 3 illustrates a block diagram 300 of the processing system 130, in accordance with some embodiments of the invention. As illustrated in FIG. 3, the processing system 130 may include a communication device 344, a processing device 342, and a memory device 350 having an authentication application/module 353, a processing system application 354 and a processing system datastore 355 stored therein. As shown, the processing device 342 is operatively connected to and is configured to control and cause the communication device 344, and the memory device 350 to perform one or more functions. Furthermore, the processing device 342 is typically configured to control and cause the processor 210 of the computer terminal 120, the sensor devices 112, and visual capture devices 114, to perform one or more functions. In some embodiments, the authentication application 353 and/or the processing system application 354 comprises computer readable instructions that when executed by the processing device 342 cause the processing device 342 to perform one or more functions and/or transmit control instructions to the computer terminal 120, the detachable item transfer mechanism 150, the authentication database 118, the third party system 116, the sensor devices 112, and visual capture devices 114, and/or the communication device 344. It will be understood that the authentication application 353 and/or the processing system application 354 may be executable to initiate, perform, complete, and/or facilitate one or more portions of any embodiments described and/or contemplated herein, and specifically embodiments directed to user activities. The authentication application 353 may comprise executable instructions associated with one or more authentication steps of user activities, and may be embodied within the processing system application 354 in some instances. In some embodiments, the authentication application 353 is similar to the authentication module 234 described previously. As such, in some embodiments, the processing device 130 in operative communication with the detachable item transfer mechanism 150, is configured to receive user authentication credentials via the detachable item transfer mechanism 150, and in response to their successful validation, cause unlocking of a movable cover of the mechanism 150.

The processing system 130 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

The communication device 344 may generally include a modem, server, transceiver, and/or other devices for communicating with other devices on the network 101. The network communication device 344 may be a communication interface having one or more communication devices configured to communicate with one or more other devices on the network 101, such as the processing system 130, the sensor devices 112, and visual capture devices 114, other processing systems, data systems, etc.

Additionally, referring to processing system 130 illustrated in FIG. 3, the processing device 342 may generally refer to a device or combination of devices having circuitry used for implementing the communication and/or logic functions of the processing system 130. For example, the processing device 342 may include a control unit, a digital signal processor device, a microprocessor device, and various analog-to-digital converters, digital-to-analog converters, and other support circuits and/or combinations of the foregoing. Control and signal processing functions of the system 130 may be allocated between these processing devices according to their respective capabilities. The processing device 342 may further include functionality to operate one or more software programs based on computer-executable program code 352 thereof, which may be stored in a memory device 350, such as the processing system application 354 and the authentication application 353. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 342 may be configured to use the network communication interface of the communication device 344 to transmit and/or receive data and/or commands to and/or from the other devices/systems connected to the network 101.

Furthermore, a "user interface" (not illustrated) may be associated with the processing system 130 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the processing system, for example on one or more workstations connected to the system 130, the user device 104, the detachable item transfer mechanism 150, or the display device 280 of the computer terminal 120. As another example, the user interface may be provided on the computer terminal 120 that may be controlled by the processing system 130 either directly or via the processor 210 of the computer terminal 120.

The memory device 350 within the processing system 130 may generally refer to a device or combination of devices that store one or more forms of computer-readable media for storing data and/or computer-executable program code/instructions. For example, the memory device 350 may include any computer memory that provides an actual or virtual space to temporarily or permanently store data and/or commands provided to the processing device 342 when it carries out its functions described herein. The processing system 130 may be used by a third party/entity 116 to interact with the computer terminal 120, based on providing requisite authorization. The processing system 130 may further comprise a user data repository 356 comprising user authentication data 357 and user account data 358. The processing system 130 may utilize the authentication data 357 to validate user authentication credentials. Furthermore, the account data 358 may reflect the current account data of the user.

Figure 4:
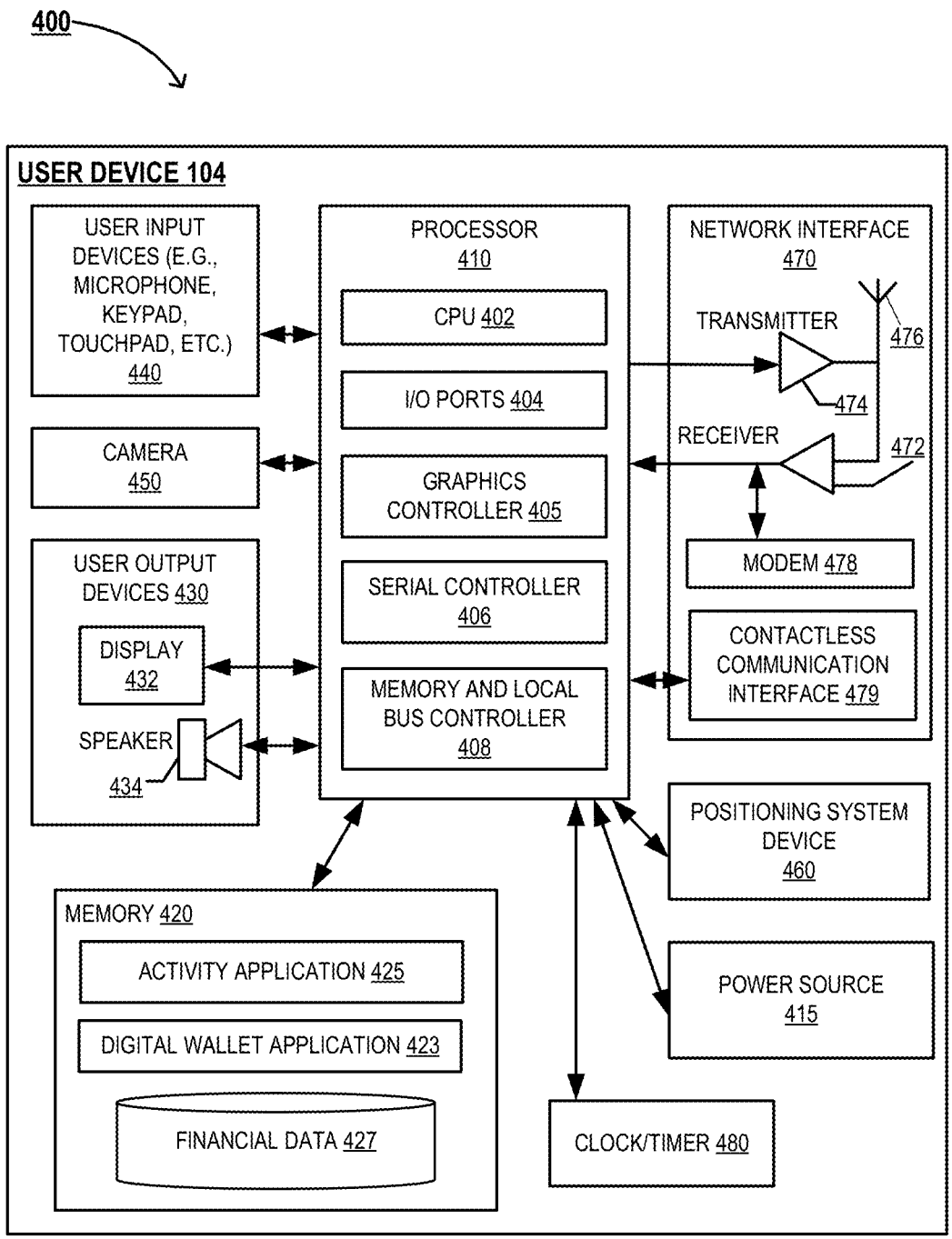
FIG. 4 illustrates a block diagram 400 of a user device, in accordance with an embodiment of the invention.

FIG. 4 illustrates a block diagram 400 of the user device 104, such as a user mobile device, in accordance with some embodiments of the invention. A "mobile device" 104 may be any mobile communication device, such as a cellular telecommunications device (i.e., a cell phone or mobile phone), personal digital assistant (PDA), a mobile Internet accessing device, the computer system of the user vehicle, or another device including, but not limited to portable digital assistants (PDAs), pagers, mobile televisions, gaming devices, laptop computers, cameras, video recorders, audio/video player, radio, GPS devices, any combination of the aforementioned devices.

The mobile device 104 may generally include a processing device or processor 410 communicably coupled to devices such as, a memory device 420, user output devices 430 (for example, a user display device 432, or a speaker 434), user input devices 440 (such as a microphone, keypad, touchpad, touch screen, and the like), a communication device or network interface device 470, a power source 415, a clock or other timer 480, a visual capture device such as a camera 450, a positioning system device 460, such as a geo-positioning system device like a GPS device, an accelerometer, and the like, one or more chips, and the like. The processor 410 may further include a central processing unit 402, input/output (I/O) port controllers 404, a graphics controller 405, a serial bus controller 406 and a memory and local bus controller 408.

The processor 410 may include functionality to operate one or more software programs or applications, which may be stored in the memory device 420. For example, the processor 410 may be capable of operating applications such as the activity application 425, a digital wallet application 423, or a web browser application. The activity application 425 may then allow the mobile device 104 to transmit and receive data and instructions from the computer terminal 120 (for example, via wireless communication or NFC channels), data and instructions from the processing system 130, web content, such as, for example, location-based content and/or other web page content, according to a Wireless Application Protocol (WAP), Hypertext Transfer Protocol (HTTP), and/or the like.

The digital wallet application 423 and the financial data module 427, together may include the necessary circuitry to provide token storage and transmission functionality, transmitter device signal encoding and decoding functionality to the mobile device 104, for secure transmission of financial and authentication credential tokens via the contactless communication interface 479 to the computer terminal 120. Generally, the financial data module 427 may be a chip in the form of an integrated circuit, a microprocessor, a system-on-a-chip, a microcontroller, or the like. Of note, while FIG. 4 illustrates the financial data module 427 as an element within the mobile device 104, it will be apparent to those skilled in the art that the financial data module 427 functionality may be incorporated separately, within other elements in the mobile device 104, or may be included in a removable storage device such as an SD card or the like.

The processor 410 may be configured to use the network interface device 470 to communicate with one or more other devices on a network 101 such as, but not limited to the computer terminal 120, the processing system 130 and the detachable item transfer mechanism 150. In this regard, the network interface device 470 may include an antenna 476 operatively coupled to a transmitter 474 and a receiver 472 (together a "transceiver"), modem 478 and a contactless communication interface 479. The processor 410 may be configured to provide signals to and receive signals from the transmitter 474 and receiver 472, respectively. The signals may include signaling information in accordance with the air interface standard of the applicable BLE standard, cellular system of the wireless telephone network and the like, that may be part of the network 101. In this regard, the mobile device 104 may be configured to operate with one or more air interface standards, communication protocols, modulation types, and access types. By way of illustration, the mobile device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 104 may also be configured to operate in accordance with non-cellular communication mechanisms, such as via a wireless local area network (WLAN) or other communication/data networks. The mobile device 104 may also be configured to operate in accordance Bluetooth® low energy, audio frequency, ultrasound frequency, or other communication/data networks.

The network interface device 470 or communication device 470 may also include a user activity interface presented in user output devices 430 in order to allow a user 102 to execute some or all of processes described herein. The application interface may have access to the hardware, for example, the transceiver, and software previously described with respect to the network interface device 470. Furthermore, the application interface may have the ability to connect to and communicate with an external data storage on a separate system within the network 101. As described above, the mobile device 104 includes a display device 432 having a user interface that includes user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440, which may allow the mobile device 104 to receive data from the user 102, may include any of a number of devices allowing the mobile device 104 to receive data from a user 102, such as a keypad, keyboard, touch-screen, touchpad, microphone, mouse, joystick, other pointer device, button, soft key, and/or other input device(s).

The mobile device 104 may further include a power source 415. Generally, the power source 415 is a device that supplies electrical energy to an electrical load. In some embodiment, power source 415 may convert a form of energy such as solar energy, chemical energy, mechanical energy, and the like, to electrical energy. Generally, the power source 415 in a mobile device 104 may be a battery, such as a lithium battery, a nickel-metal hydride battery, or the like, that is used for powering various circuits, for example, the transceiver circuit, and other devices that are used to operate the mobile device 104. Alternatively, the power source 415 may be a power adapter that can connect a power supply from a power outlet to the mobile device 104. In such embodiments, a power adapter may be classified as a power source "in" the mobile device 104.

The mobile device 104 may also include a memory buffer, cache memory or temporary memory device operatively coupled to the processor 410. Typically, one or more applications 425 and 423, are loaded into the temporarily memory during use. As used herein, memory may include any computer readable medium configured to store data, code, or other information. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

Figure 5:
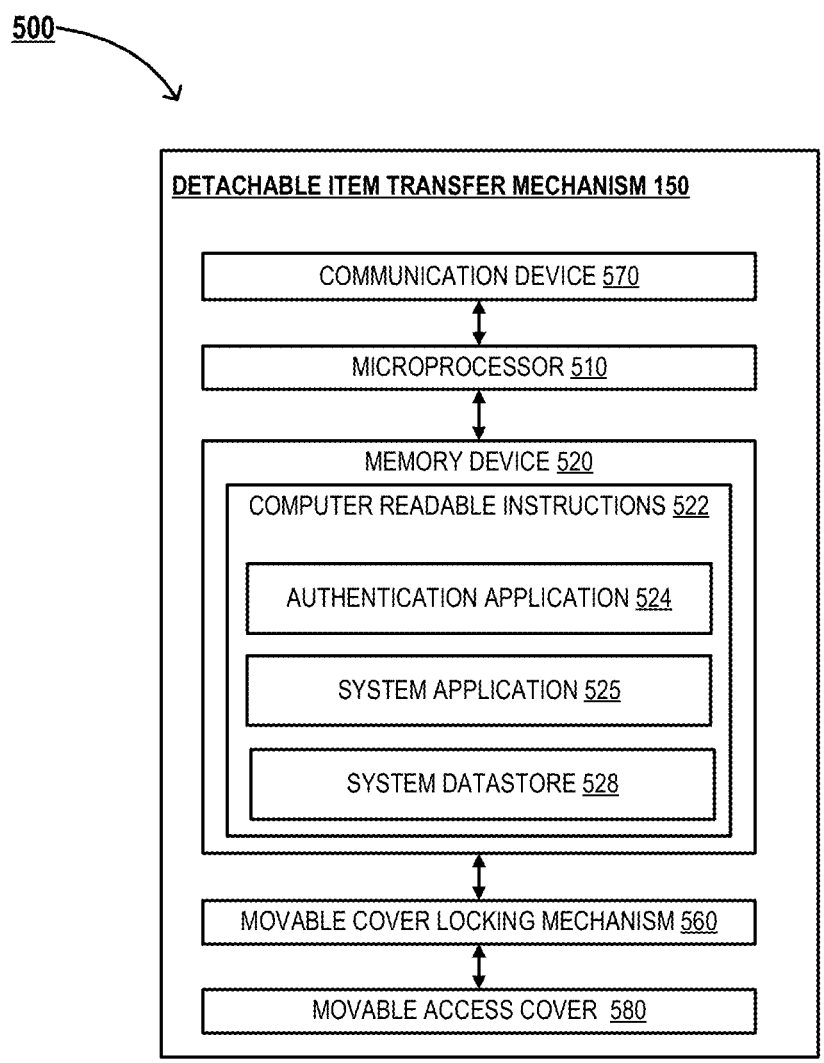
FIG. 5 illustrates a block diagram 500 of a detachable item transfer mechanism, in accordance with an embodiment of the invention.

FIG. 5 illustrates a block diagram 500 of the detachable item transfer mechanism 150, in accordance with one embodiment of the invention. As discussed previously, the detachable item transfer mechanism 150 is typically in operative communication with the computer terminal 120, the processing system 130 and/or the user device 104, via suitable wireless communication channels of the network 101. As discussed previously, the detachable item transfer mechanism 150 is configured to allow secure retrieval of items from the computer terminal 120.

The detachable item transfer mechanism 150 typically includes a housing 152 (illustrated in FIGS. 10B and 10C) defining a cavity and an opening to the cavity. The item transfer mechanism also typically includes a movable access cover 580 or a movable cover 580, and a locking mechanism 560 that is configured to secure movable cover over the opening. The locking mechanism 560 is configured to engage the movable cover 580 to thereby secure the movable cover 580 in the closed position, The locking mechanism 560 is also typically configured to disengage the movable cover 580 to an open position in response to a user providing authentication credentials and/or receiving an unlock command from the computer terminal 120. The detachable item transfer mechanism 150 further comprises a microprocessor 510 or another processing device, and a communication device 570. In some embodiments, the microprocessor 510 is similar in structure to the processor 210 and 410 described previously, while the communication device 570 is similar to the communication device 270 and the network interface device 470 described previously. The microprocessor 510 is typically in operative communication with the locking mechanism 560 and the communication device 570, and is configured to cause these devices to perform one or more functions. For example, the microprocessor 510 is typically configured to cause the locking mechanism 560 to engage and/or disengage movable cover 580 over the opening.

In some embodiments, the user 102 may provide the authentication credentials at the computer terminal using the input/output devices (240, 286) of the computer terminal 120, and/or using the input/output devices (440, 430) of the user device 104, in operative communication with the terminal 120. In such embodiments, based on the successful validation of the authentication credentials, the computer terminal 120 may transmit control instructions to the detachable item transfer mechanism 150, via the communication device 570, to cause the microprocessor 510 to disengage the movable cover 580.

In some embodiments, the detachable item transfer mechanism 150 may further comprise user interface devices 158 (illustrated in FIGS. 10B and 10C), configured for receiving authentication credentials from the user. The user interface devices are typically similar to the input/output devices (240, 286) of the computer terminal 120 and the input/output devices (440, 430) of the user device 104. In this regard, in some embodiments the authentication credentials provided by the user at the user interface devices 158, and/or authentication credentials received at the mechanism 150 from the user device 104 (for example, authentication tokens received via NFC, user authentication credentials provide at the user device 104 in communication with the mechanism 150) may be validated by the microprocessor 510, while in other embodiments, the received credentials may be transmitted to and validated by the computer terminal 120. In response to the successful validation of the credentials, the microprocessor 510 may cause the locking mechanism 560 to disengage the movable cover 580. In this regard, the detachable item transfer mechanism 150 may further comprise a memory device 520 in operative communication with the microprocessor 510. In some embodiments, the memory device 520 comprises computer readable instructions 522 associated with a system application 525 and an authentication application 524 that when executed by the microprocessor 510, cause the microprocessor to present a user interface, receive authentication credentials, validate authentication credentials, and cause unlocking of the movable cover 580. In some embodiments, the microprocessor 510 may retrieve authentication credentials stored in a system datastore 528 of the memory device 520 to validate authentication credentials received from the user. In some embodiments, the microprocessor 510 may retrieve authentication credentials from the computer terminal 120, the processing system 130 and/or other systems to validate authentication credentials received from the user.

In some embodiments, the user may provide an indication that the user seeks to perform a user activity that involves retrieval of first items via the detachable item transfer mechanism 150. The user may provide this indication at the computer terminal 120 and/or via the user device 104 in communication with the terminal 120. Typically, the user indication comprises receiving a first authentication credential from the user associated with authorization for user activities associated with computer terminals 120. Based on the successful validation of the first authentication credentials, the terminal 120 may dispense the first items into the secure cavity of the detachable item transfer mechanism 150 via the docking station 292 and/or allow the removal of the detachable item transfer mechanism 150. In addition, the computer terminal 120 may transmit and store second authentication credentials, that are specific to the user 102 and that associated with user access to the mechanism 150 in the datastore 528. These second authentication credentials are typically temporarily stored in the datastore 528, for example, for a predetermined period of time, until the user 102 retrieves the first items, until the mechanism 150 is replaced in the docking station 292 and/or the like. Next, by means of actuators, the docking station 292 may allow the user to withdraw the detachable item transfer mechanism 150 from the terminal 120. The user may then transport the detachable item transfer mechanism 150 to a secure location, for example, the user's vehicle or another secure location, and provide second authentication credentials for access to the first items. The microprocessor 510 may validate the credentials received from the user based on retrieving the stored credentials from the datastore 528. Elapsing of a predetermined period of time, replacing of the detachable item transfer mechanism 150 into the docking station 292, utilization of a predetermined number of authentication attempts by the user 102 and/or the like may cause the processor 510 to automatically erase the second authentication credentials stored in the datastore 528. Therefore, the detachable item transfer mechanism 150 may facilitate remote user authentication without requiring communication with other systems, and provide optimal utilization of the datastore 528 by temporarily storing user specific and activity specific credentials in the memory device 520.

In some embodiments, and in addition to the validation of authentication credentials described above, the microprocessor 510 may cause the disengagement of the movable cover 580, based on validation of a location parameter as well. Validation of the location parameter typically comprises determining that the current location of the detachable item transfer mechanism 150 is within a predetermined distance from the terminal and/or within a predetermined area (such as the location of the user's residence). In some embodiments, the microprocessor 510 may validate the location parameter based on validating current location coordinates retrieved from a location determining device (not illustrated) of the detachable item transfer mechanism 150. In some embodiments, the microprocessor 510 may validate the location parameter based on validating current location coordinates retrieved from a location determining device of the user device 104 in operative communication with the detachable item transfer mechanism 150 via a NFC channel. In some embodiments, the microprocessor 510 may validate the location parameter based on determining that the detachable item transfer mechanism 150 is within a wireless broadcast area of the computer terminal, based on establishing a wireless communication channel between the communication device 570 and the terminal 120. Although described with respect to the microprocessor 510, it is understood that the computer terminal 120 may validate the location parameter using the methods described above and transmit a validation confirmation to the microprocessor instead. In some embodiments, the detachable item transfer mechanism 150 remains locked if the location parameters are exceeded. In some embodiments, the detachable item transfer mechanism 150, even if previously unlocked at a validated location parameter, is configured to be dysfunctional or at least a portion of its functionality is disabled, when its location does not meet the location parameters.

In some instances, various features and functions of the invention are described herein with respect to a "system." In some instances, the system may refer to the computer terminal 120 performing one or more steps described herein in conjunction with other devices and systems, either automatically based on executing computer readable instructions of the memory device 230, or in response to receiving control instructions from the processing system 103. In some instances, the system refers to the detachable item transfer mechanism 150. In some instances, the system refers to the processing system 103. In some instances, the system refers to the devices and systems on the network environment 100 of FIG. 1.

Figure 6:
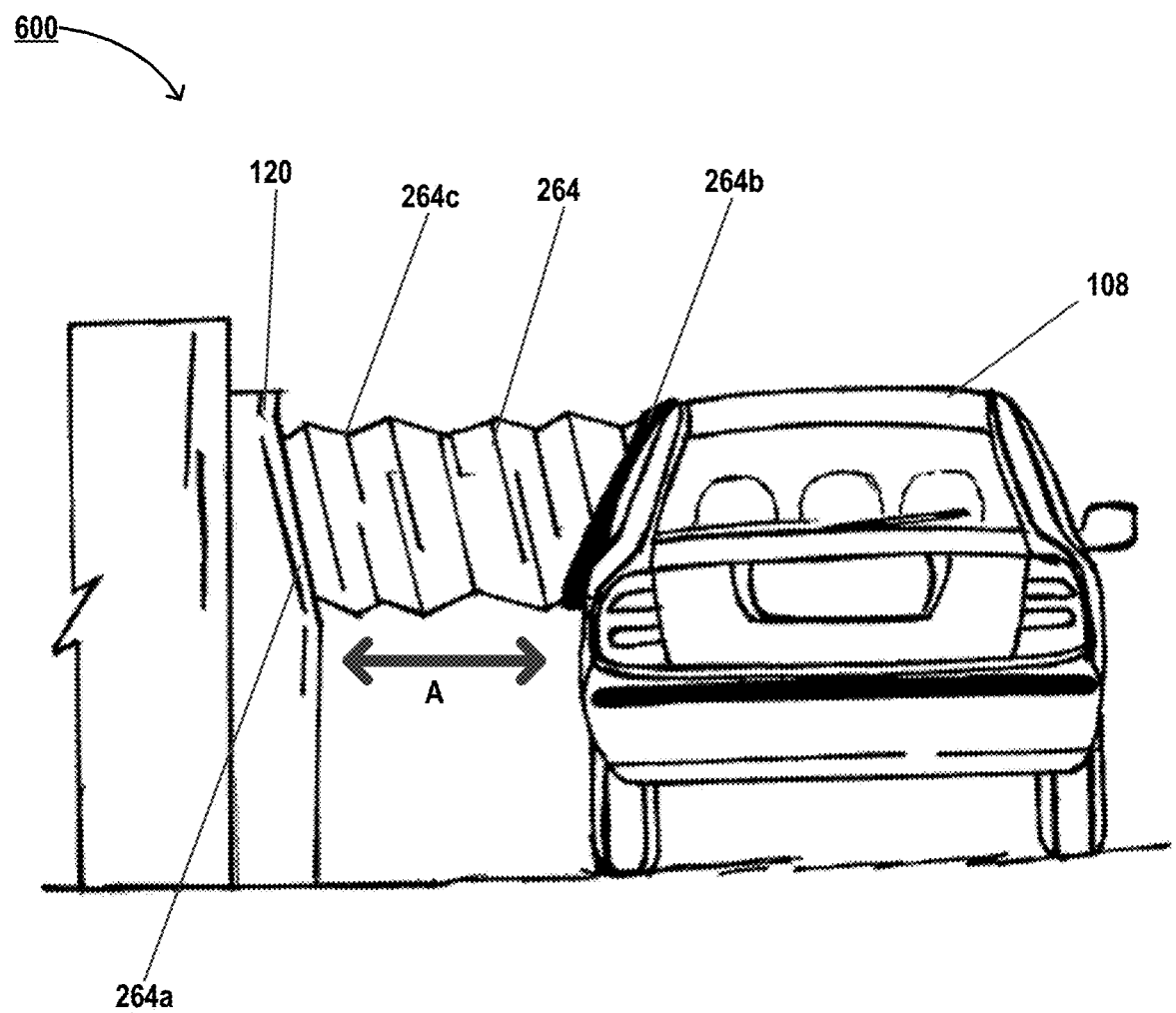
FIG. 6 illustrates a side view 500 of a computer terminal environment, in accordance with an embodiment of the invention.

FIG. 6 illustrates a side view 600 of a computer terminal environment, in accordance with one embodiment of the computer terminal 120. The functions and features of the computer terminal 120, and the retractable privacy conduit 264 in particular, illustrated herein is similar to those described with respect to FIG. 2. Specifically, FIG. 6 illustrates the computer terminal 120 equipped with the privacy module comprising a retractable privacy conduit 264 operatively coupled to and controlled by one or more actuator devices (not shown). The retractable privacy conduit 264 is suitably positioned and oriented on the computer terminal 120 such that extension of retractable privacy conduit 264 is configured to engage a proximate portal of a vehicle 108. Although FIG. 6 illustrates the computer terminal 120 having a single retractable privacy conduit 264, it is understood that more or fewer barriers may be employed.

As alluded to previously, the retractable privacy conduit 264 of the computer terminal 120 provides increased privacy and security to a user located in the vehicle 108. Typically, the retractable privacy conduit 264 is a secure connector or channel that is configured to engage a portal of a vehicle to facilitate execution of user activities through the retractable privacy conduit 264. As discussed previously, the system, i.e., the computer terminal 120, may employ one or more sensor devices 112 and/or 290 to determine that the vehicle 108 is proximate to the computer terminal. In response to determining that the vehicle 108 is proximate to the computer terminal, the system, using the one or more sensor devices 112 and/or 290 may further determine a location of a portal of the vehicle 108. Furthermore, as discussed previously, the system may identify a plurality of portals of the vehicle 108 and subsequently identify a primary portal of the plurality of portals based on determining that the primary portal is the most proximate to the retractable privacy conduit 264 when extended, based on determining that the user 102 is located proximate the primary portal in the vehicle, based on determining that a user device 104 in wireless communication with the terminal 120 is proximate the primary portal, based on receiving an indication from the user 102 via the user device 104 in wireless communication with the terminal 120, based on determining a gesture, a voice command, and the like, from the user 120, and/or based on identifying that the primary portal is the most proximate portal with respect to the computer terminal 120.

Typically, the retractable conduit 264 comprises a proximal end 264a, a distal end 264b, and a barrier 264c between the proximal end 264a and the distal end 264b (illustrated in FIG. 6). Typically, the retractable conduit 264 is extendable to an extended position to engage a vehicle 108, as illustrated by FIG. 6. The proximal end 264a is typically proximate to and operatively connected with the computer terminal 120. At the retracted position, in some embodiments, the proximal end 264a and the distal end 264b are proximate or substantially adjacent each other. As the retractable privacy conduit 264 is moved to an extended position by the actuator based on identifying the portal, the distal end 264b moves away from the proximal end 264a, thereby increasing the distance between the proximal end 264a and the distal end 264b. For instance, FIG. 6 illustrates the extension of the retractable privacy conduit 264 to a distance A, i.e, the linear displacement of the distal end 264b by a length A with respect to the proximal end 264a of the retractable privacy conduit 264. When the retractable privacy conduit 264 is moved to a retracted position by the actuator, for example, after completion of the user activity, and/or after determining that the vehicle 108/the portal are no longer proximate, the distal end 264b moves towards the proximal end 264a, thereby decreasing the distance between the proximal end 264a and the distal end 264b. Although described as linear displacement in this example, it is understood that retractable privacy conduit 264 may be extended along any suitable curvilinear path, along any suitable angle/rotation, at a suitable tilt, and/or at a suitable speed. The barrier 264c may be configured to extend and retract in accordance with the range of motions described herein.

Typically, the retractable privacy conduit 264 is extended to the length A such that the distal end 264b engages the portal. In this regard, the system may further employ the sensor devices, such as contact sensor devices (not illustrated) at the distal end 264b, to identify engagement with the portal. In response to identifying that the distal end 264b engages the portal, the system may cease extension of the conduit 264. Similarly, the system may further employ the sensor devices, such as contact sensor devices at the distal end 264b, to identify that the distal end 264b only partially engages the portal. Here, the system may employ suitable actuators, to alter the length of extension, location/position and/or orientation of the distal end 264b to cause the distal end 264b to engage the portal. In addition, the system may further employ the sensor devices to identify that the distal end 264b does not engage the portal (for example, even after maximum extension of the retractable privacy conduit 264). Here, the system may provide instructions to the user (for example via the display devices of the terminal 120, via the user device 104, and the like) to position the vehicle in a more suitable location. In some instances, the system may retract the retractable privacy conduit 264 based on determining that the user activity/interactive session is complete, based on determining that the vehicle 108 is no longer proximate to the terminal 120, based on receiving an indication from the user and the like.

The size, shape, position, orientation, and length of extension of the retractable privacy conduit 264 is typically configured such that the conduit, when engaged with the vehicle, provides a secure enclosure, separate from the surrounding environment for execution of one or more user activities. In some embodiments, the distal end 264b of the retractable privacy conduit 264 is flexible to conform to and/or surround the contours of the portal of the vehicle. While in some embodiments, the system may modify the contours of the distal end 264b, in other embodiments, the user may suitably move the contours. Typically, the distal end 264*b* of the retractable privacy conduit 264 is constructed such that, engagement of the conduit with the vehicle does not scratch or otherwise damage surfaces and components of the vehicle during or after the engagement/disengagement. In some embodiments, the distal end 264*b* engages the portal of the vehicle to provide an air-tight or substantially air tight engagement.

Figure 7:
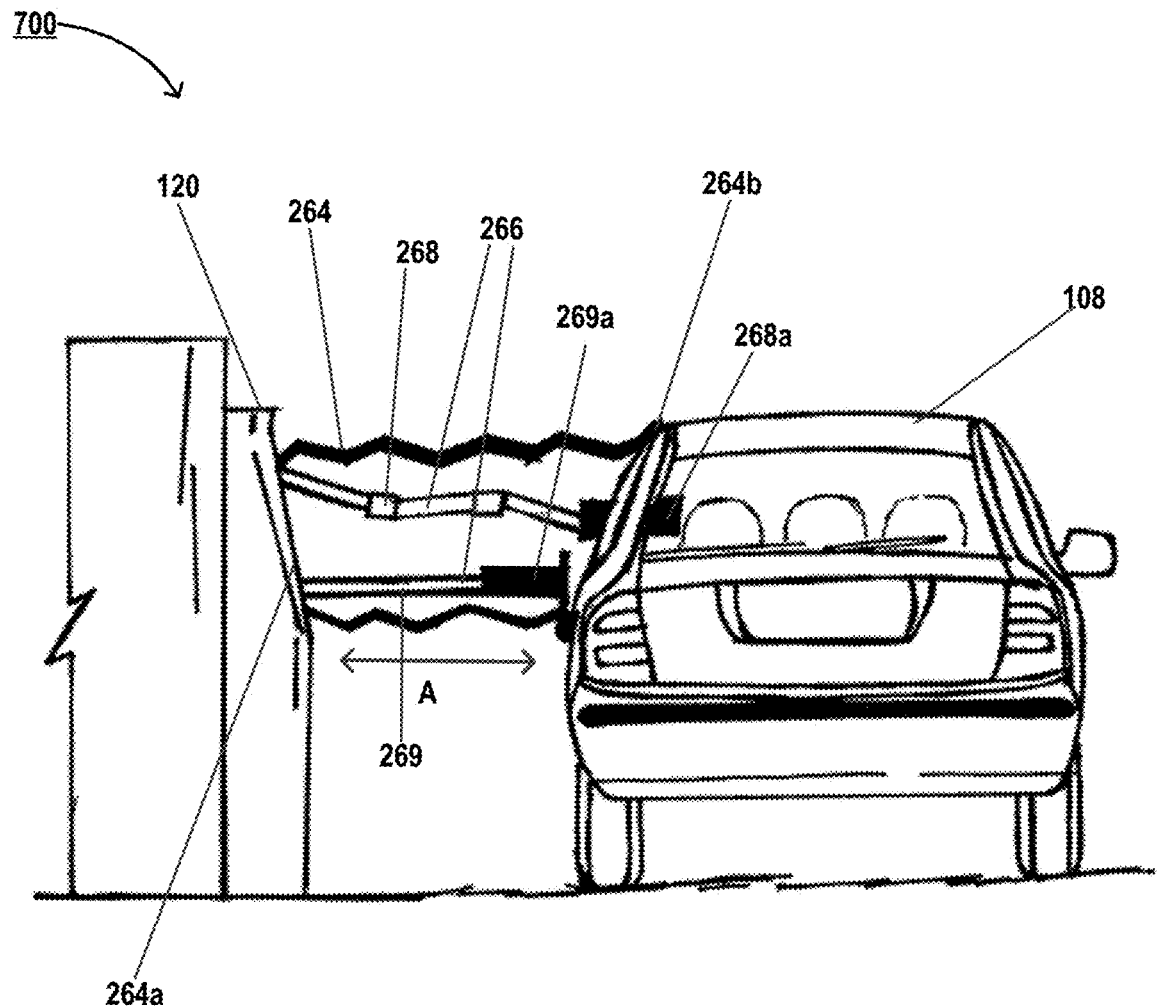
FIG. 7 illustrates a side sectional view 700 of a computer terminal environment, in accordance with an embodiment of the invention.

FIG. 7 illustrates a side sectional view 700 of a computer terminal environment, in accordance with the embodiment of the computer terminal 120 illustrated in FIG. 6. Specifically, FIG. 7 illustrates the item transfer mechanism 266 of the computer terminal 120. As discussed previously, the barrier 264*c* of the retractable privacy conduit 264 typically encloses an interior volume of the conduit between the proximal and distal ends (264*a*, 264*b*), such that the barrier 264*c* physically separates the interior volume from the environment when engaged with a vehicle. In some embodiments, the user may physically interact with the input and output devices on the terminal 120, through the interior volume, during an interactive session. In some embodiments, the terminal 120 comprises the item transfer mechanism 266 that is configured to extend through the interior volume and facilitate user interactions with the terminal. In this way, the user may interact with the computer terminal 120 with ease, and even when the vehicle 108 is positioned at a farther distance from the terminal 120 that is not conductive to physical access to the terminal 120 from the vehicle 108.

As discussed previously, the barrier 264*c* is configured to separate the item transfer mechanism 266 from the environment during the interactive session. Typically, the item transfer mechanism 266 is also in a retracted state when the retractable privacy conduit 264 is in a retracted position. In some embodiments, the system is configured to extend the item transfer mechanism 266 through the interior volume of the barrier 264*c*, (i) based on determining that the distal end 264*b* of the retractable privacy conduit 264 engages the portal of the vehicle, (ii) based on determining that the current user interactive session/user activity requires input/output devices or an item transfer mechanism, and/or (iii) based on receiving an indication from the user.

Typically, the item transfer mechanism 266 comprises one or more extension arms (268, 269) that are operatively coupled to the actuator devices 262, particularly at their proximal ends. The system, via the actuator devices, is configured to extend the arms (268, 269) to a suitable length inside the conduit 264. As such, distal ends of the item transfer mechanism 266 may be extended to the length A of the extension of the conduit 264, to a length lesser than the length A and/or to a length greater than the length A (for example, into the vehicle 108 as indicated by arm 268). In some embodiments, the extension arm is a linear extension arm 269. The linear extension arm is typically extendable along a linear direction. For instance, the linear extension arm 269 may be extended using sliding motion such as a drawer or telescopic motion. In some embodiments, the extension arm is a mechanical arm 268 that is configured for multiple linear and rotational degrees of freedom. In this regard, the mechanical arm 268 may comprise one or more joints and connectors that render the arm 268 to be infinitely configurable along the 6 degrees of freedom.

Furthermore, the one or more extension arms (268, 269) may comprise one or more interactive devices (268*a*, 269*a*) at their distal ends for use during the user interactive session/user activity. As illustrated by FIG. 7, the item transfer mechanism 266 may comprises a secure device for securely dispensing/retrieving one or more items to/from the user, for example at interactive device 268*a* of arm 268. In some embodiments, the secure device is substantially similar to the detachable item transfer mechanism 150 described in this disclosure. Although, in this instance, the detachable item transfer mechanism 150 need not be detachable, and may be operated while being mounted on the arm 269. That said, in some embodiments, the secure device, and other interactive devices are detachable from the arms. In some embodiments, the interactive device may comprise one or more user input/output devices (for example, input devices 240 described previously, output devices 286 described previously, a touch screen and the like) to facilitate user interaction with the terminal during the user activity, to receive user input, credentials and the like, for example, at interactive device 269*a* of the arm 269. As such, the interactive device 269*a* may comprise the display 282 configured to present a user interface for an interactive session with the user 102. The interactive device 269*a* may comprise user input devices 240, card readers 244, currency dispensers 246 and other components for facilitating the interactive session.

As an alternative to the item transfer mechanism 266, in some embodiments, the user may physically contact and operate one or more features on the face of the computer terminal 120, for example, by reaching in through the retractable privacy conduit 264.

Figure 8:
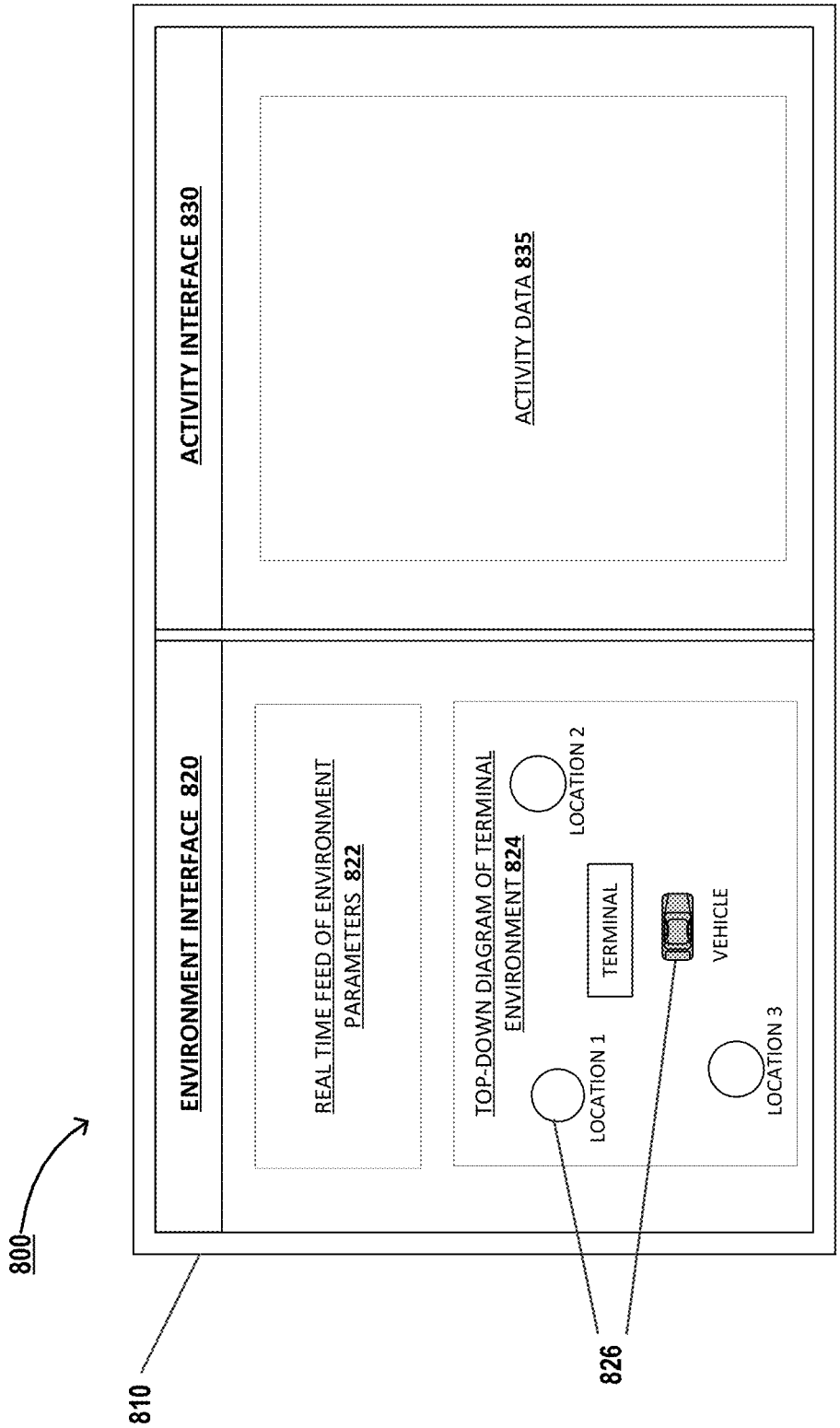
FIG. 8 illustrates an integrated interactive graphical user interface 800, in accordance with an embodiment of the invention.

FIG. 8 illustrates, an integrated interactive user interface 800 (also referred to as a "graphical user interface 800"), which is configured to be presented on the display 280 of the computer terminal 120, in accordance with one embodiment of the invention. However, the integrated interactive user interface 800 may also be presented on other devices such as the user device 104 (for example, on a user mobile device interface, on an interface associated with a computer device of the vehicle 108, and the like), display of the interactive devices (268*a*, 269*a*) of the item transfer mechanism 266, display of detachable item transfer mechanism 150, and the like. The integrated interactive user interface 800 is typically a composite interface, which is created by the system by embedding elements and functionality associated with the user activity being performed and environment parameters into a single interactive interface. Specifically, the integrated interactive user interface 800 comprises an activity interface 830 associated with the user activity being performed and an environment interface 820 associated with environment parameters and triggers, integrated into a single interface. The activity interface 830 typically comprises activity data and functional graphical elements 835 associated with the user activity.

The environment interface 820 typically comprises a real time feed of environment parameters 822. In some embodiments, the real time feed of environment parameters 822 comprises audio-visual information from the surroundings of the terminal 120, or a predetermined locality of the terminal, captured in real-time. In some embodiments, the real time feed of environment parameters 822 comprises real-time news feeds retrieved from other systems, such as the processing system 130 and third party system 113, display of determined triggers (such as, identifying, using sensor devices, presence of another individual at a first location in the vicinity of the terminal, determining that another individual has been in the proximity of the user for a predetermined period of time, and the like), and the like. In some embodiments, the system may display information associated with the determined triggers, for example, as pop-up alerts within the environment interface 820/the graphical user interface, or within the real-time feed 822. For example, the system may display information associated with a trigger of determining presence of an individual at a predetermined distance from the terminal 120, or an environmental trigger based on detecting environmental parameter or receiving information about an incident in the locality and the like.

In addition, in some embodiments, the environment interface 820 may further comprise a top-down diagram of the terminal environment 824, indicating the relative positions of the terminal, user/user vehicle 108, and one or more individuals/vehicles present at one or more locations around the terminal. In this way, the user is able to effectively gauge the surroundings, while also being able to perform the user activity. In addition, the user may request extension/retraction of the retractable privacy conduit 264, through the interface 800, based on analyzing the environment interface 820.

As described previously, the system is configured to perform actions, in real-time, or near real-time, after occurrence of an event, such as, determination of a trigger in real-time in the event of an individual being present proximate to the user at the terminal, display of the real-time news feed or alert in response to events or incidents, and the like. As used herein, real-time or near real-time actions of the system, refer to actions that are performed synchronous with or substantially synchronous with the occurrence of the event. Specifically, in some instances, the system performs a real-time action instantaneously after determining an event. For example, the system may detect the presence of another individual near the user, instantaneously or within 1 or 2 seconds or less, of the event of the individual arriving near the user. In some instances, real-time or near real-time actions are performed substantially synchronous, or within a predetermined time after the occurrence of the event. For example, the system may display an alert associated with an environmental trigger of an incident received from another secondary system. Here, the alert may be displayed within a predetermined time, such as a few seconds or minutes of occurrence of the incident, based on the response time of the secondary system, the time that the incident data was received at the system, time taken to process the data, unavoidable processing and memory times and the like.

Figure 9:
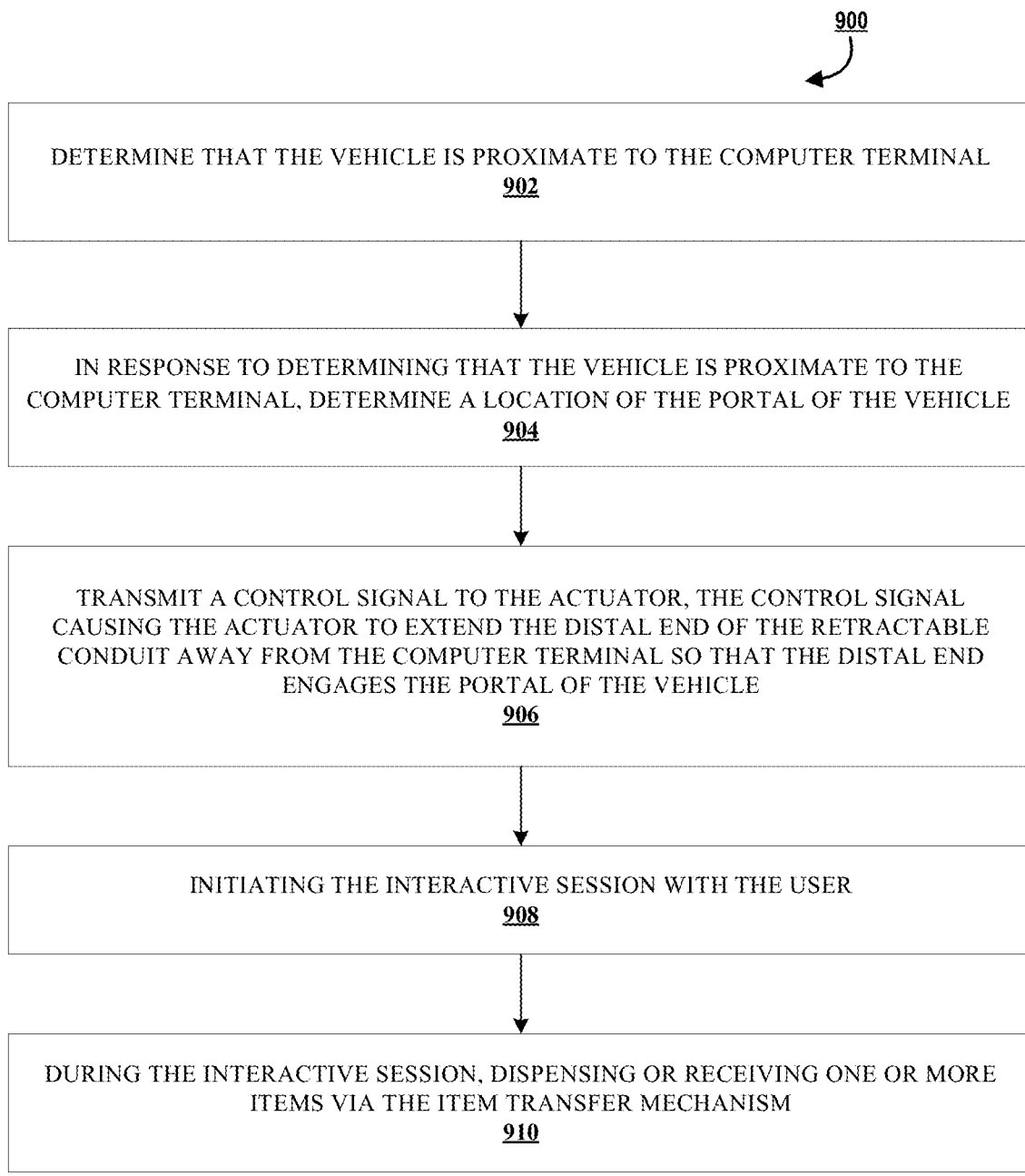
FIG. 9 illustrates a high level process flow 900 for providing a secure interactive session to a user at a computer terminal, in accordance with an embodiment of the invention.

Referring now to FIG. 9, illustrating a high level process flow 900 for providing a secure interactive session to a user at a computer terminal. At first, the system determines that a vehicle 108 associated with the user is proximate to the computer terminal 120, as indicated by block 902. In this regard, the system employs one or more sensor devices (112, 290), such as proximity or position sensors to determine that the vehicle is proximate to the computer terminal 120, as described in detail previously. Next, at block 904, in response to determining that the vehicle is proximate to the computer terminal, the system determines a location of the portal of the vehicle, as described previously.

In response to determining the location of the portal of the vehicle, the system typically transmits a control signal to the actuator associated with the retractable privacy conduit 264. The control signal causes the actuator to extend the distal end of the retractable conduit away from the computer terminal so that the distal end engages the portal of the vehicle, as indicated by block 906 and described in detail with respect to FIGS. 2, 6 and 7. Furthermore, as described previously, the system is configured to extend the item transfer mechanism 266 away from the computer terminal and toward the vehicle. Specifically, after the distal end of the retractable conduit engages the portal of the vehicle, the system may transmit a second control signal to a second actuator associated with the item transfer mechanism 266. The second control signal typically causes the second actuator to extend the item transfer mechanism at least partially through the retractable conduit and toward the portal of the vehicle. As discussed previously, the item transfer mechanism 266 typically comprises one or more extendable arms and interactive devices (268a, 269a) at the distal ends of the arms. As such, the system is configured to transmit the second control signal to the second actuator to cause the second actuator to extend an extendable arm comprising a display interactive device at least partially through the retractable conduit and toward the portal of the vehicle. Furthermore, the system is configured to present the user interface on the display interactive device.

The system then typically initiates the interactive session with the user, at block 908. In some instances, the system receives a request for initiating an interactive session from an interface associated with the user device 104 in communication with the computer terminal 120, such as a user mobile device and/or a computer device associated with the vehicle 108. In response to receiving the request from the user device (such as the user mobile device, or the computer device of the vehicle 108), the system is configured to establish a secure communication channel with the user device. The system may further initiate an interactive session via the interface of the user device. Alternatively, or in addition to the above, the system may initiate an interactive session on another interface, such as the interface of the computer terminal 120, the interface associated with the item transfer mechanism 266, detachable item transfer mechanism 150, and the like. During the interactive session, the system is configured to receive an interactive command or another form of user input over the secure communication channel from the user device (such as the user mobile device, or the computer device of the vehicle 108), and proceed with the performance of one or more user activities accordingly.

That said, the system is also configured to present a graphical user interface typically comprising data associated with the one or more parameters of the environment, on the user device interface, as described in detail with respect to FIG. 8. As discussed, in some instances, the sensors are configured to monitor a first parameter of the one or more environmental parameters. The system may then display the data associated with the first parameter on the graphical user interface, for example, by displaying the environment interface 820 on the user device (such as the user mobile device, or the computer device of the vehicle 108).

As such, the graphical user interface comprises real-time data associated with the one or more parameters of the environment. Furthermore, the system is also configured to alert the user via the graphical user interface in the event of an environmental trigger (for example, a predetermined incident in the locality or the vicinity of the terminal, an individual located near the terminal for a predetermined period of time, and the like). The system may alert the user and one or more other systems or authorities, before, after and/or during the user activity. For example, based on determining that an environmental condition exists, the system may display an indicator that the environmental condition exists on the graphical user interface (for example, within the environment interface 820 of the graphic user interface 800). Furthermore, the system is configured for displaying a diagram of at least a portion of the environment adjacent to the computer terminal on the graphical user interface, as indicated by the top-down diagram of the terminal environment 824 of FIG. 8.

In some instances, the system may assign a security word or phrase, which automatically triggers presentation of the predetermined security interface or extension of the retractable privacy conduit 264. For example, in the event that the user believes that the user activity is compromised, the user may voice the security word or phrase or present a predetermined security gesture. The system may capture and analyze the word or gesture, in real time or near real time, and in response, automatically present the predetermined security interface or extend the retractable privacy conduit 264. For example, in the event that the user provides the security word or phrase during a transaction after completion of a first portion of steps, the system may initiate the presentation of the security interface, and automatically discard the data associated with the first portion of steps to ensure security of the user data. In some instances, the system may cease the presentation of the predetermined security interface and allow the user commence another activity, only after receiving another predetermined security word or gesture from the user and/or determining that the biometric triggers of the user occur within a predetermined normal range. Subsequently, during the interactive session, the system then dispenses or receives one or more items via the item transfer mechanism, as indicated by block 910, and described with respect to the item transfer mechanism 266.

As another example, the system is configured for monitoring one or more biometric parameters of the user using one or more biometric sensors, as discussed previously. In this regard, the system may identify a trigger event based on determining that one or more biometric parameters of the user exceed a predetermined threshold, such as elevated heart rate exceeding a predetermined threshold value, stress levels exceeding a predetermined threshold, body temperature exceeding a predetermined threshold, predetermined pupil dilation, abnormal speech patterns, user hand/body tremors, and the like. Here, based on the determination of the biometric trigger, the system may identify that a user condition, such as anxiety, fatigue or duress, exists. In some embodiments, based on identifying the user condition, the system may modify, in real time, the parameters of user activities (for example, reducing the withdrawal limit, preventing access to one or more accounts, generating additional alerts and the like). In some instances, modifying the parameters of the user activity comprises modifying the time/duration of the user activity. For example, the system may increase wait time or duration for withdrawal, increase wait time for display of the user interfaces, and the like. In some embodiments, in response to identifying the user condition, the system may indicate to the user (for example, via the detachable item transfer mechanism 150 or item transfer mechanism 266) that another computer terminal, within a predetermined distance from the user location, is better equipped to assist the user's condition and any user activities that the user may seek to perform. In such instances, the system may route the user (for example, using the user mobile device or the computer of the user vehicle) to the identified computer terminal. In some embodiments, based on determining the user condition and/or based on determining that a user activity performed at the terminal 120 may be compromised, the system may transmit the vehicle identifier of the user vehicle 108 and the activity details to pertinent authorities, such as a financial institution associated with the activity.

In some embodiments, the system comprises an artificial intelligence engine that is configured to analyze typical user behavior and learn new behaviors of the user. The engine may further be able to identify biometric trigger events and user condition based on deviation from typical and learned user behaviors. In some instances, engine may further be able to identify biometric trigger events and user conditions based on learned user behaviors of other secondary users that are similar to the user.

Figure 10A:
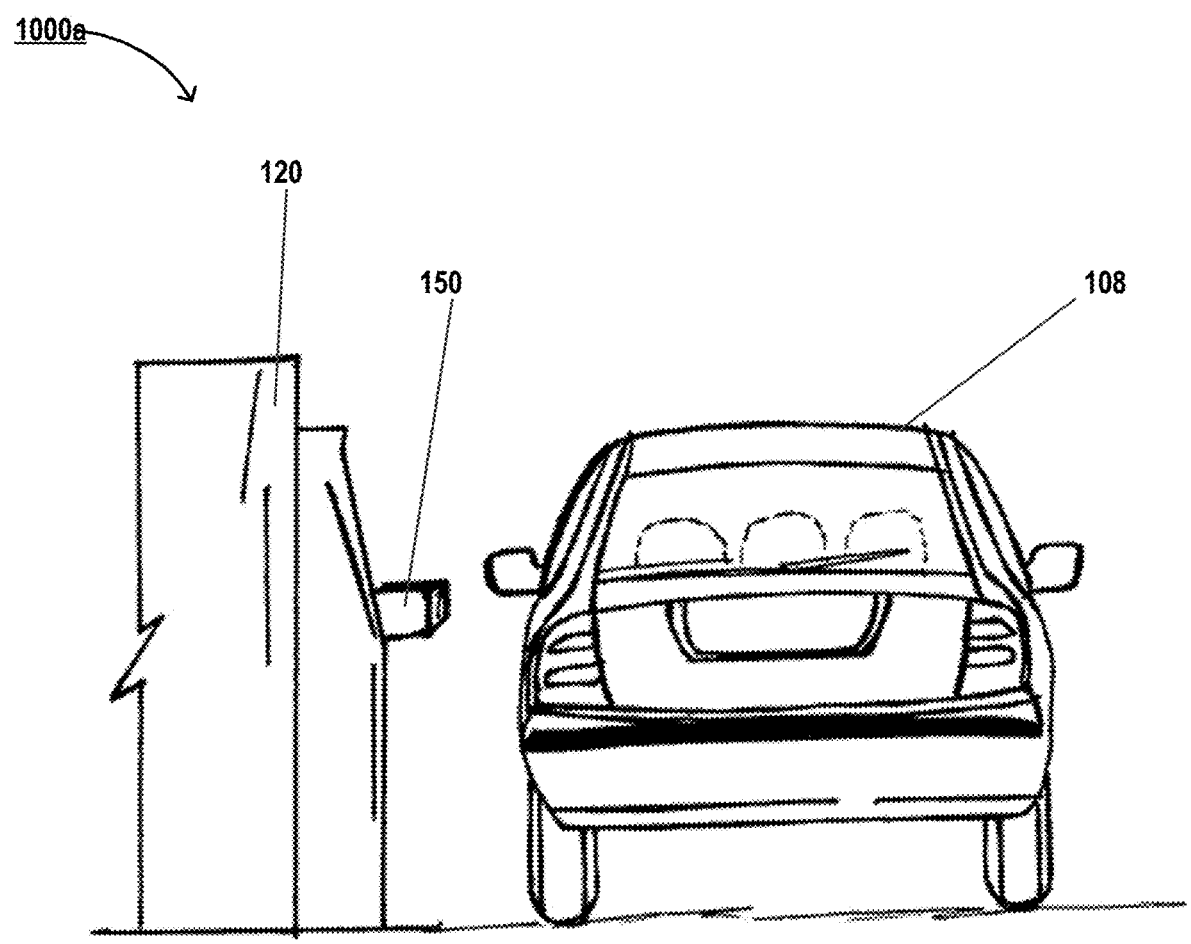
FIG. 10A illustrates a side view 1000*a* of a computer terminal environment, in accordance with an embodiment of the invention.

FIG. 10A illustrates a side view 1000*a* of a computer terminal environment, in accordance with another embodiment of the computer terminal 120. The functions and features of the computer terminal 120, and the detachable item transfer mechanism 150 in particular, illustrated herein is similar to those described with respect to FIGS. 2 and 5. Specifically, FIG. 10A illustrates the computer terminal 120 equipped with the detachable item transfer mechanism 150 operatively coupled to and controlled by one or more actuator devices (not shown). The detachable item transfer mechanism 150 is suitably positioned and oriented on the computer terminal 120. As discussed previously, the user may retrieve the detachable item transfer mechanism 150 and place the detachable item transfer mechanism 150 in the user's vehicle 108, a secure location or a predetermined authorized location/area. Thereafter, the user may retrieve one or more items from the mechanism 150 and/or place one or more items into the mechanism 150, based on requisite authentication, in the privacy and security of the user's vehicle. Specifically, the user may retrieve the detachable item transfer mechanism and place the detachable item transfer mechanism 150 in the user's vehicle 108. Thereafter, the user may provide authentication credentials (for example, a 4-digit numeric code, an authentication token from the user device, a biometric identifier, and the like) to an interface device of the detachable item transfer mechanism 150 in order to unlock the secure cavity and collect the items contained within (for example, cash). In addition to the computer terminal dispensing items into the secure cavity, the user may place items (e.g., cash and/or checks) that the user wishes to deposit with the computer terminal in the secure cavity. Accordingly, although the user may be exposed to their environment when retrieving the detachable item transfer mechanism or returning the detachable item transfer mechanism to the computer terminal, the user may interact with detachable item transfer mechanism from the security of their vehicle, thereby allowing the user to retrieve items from the computer terminal or depositing items with the computer terminal without directly exposing such items to the environment outside the vehicle.

Figure 10B:
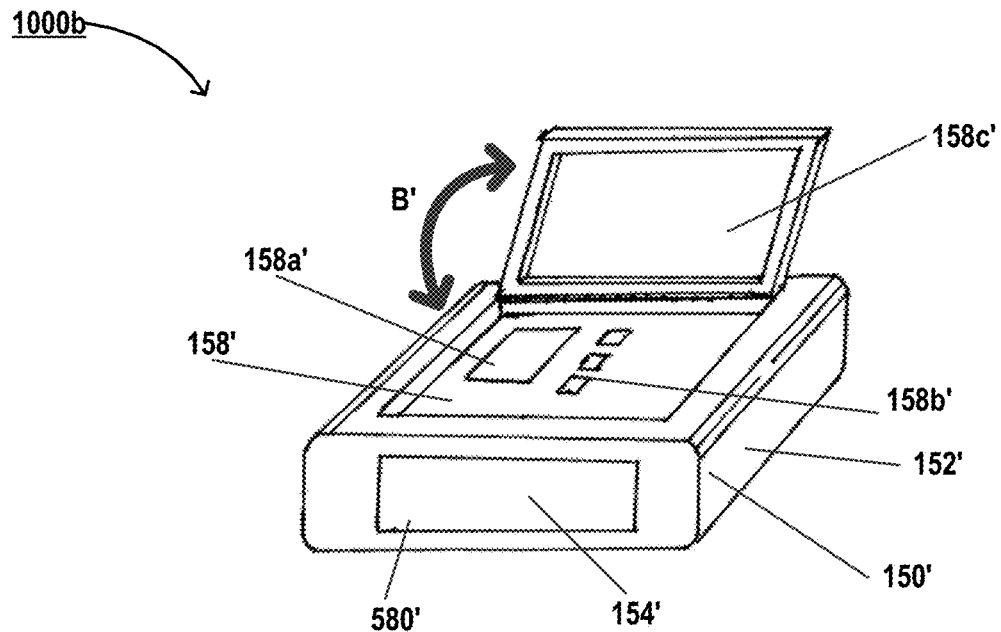
FIG. 10B illustrates a perspective view 1000*a* of a detachable item transfer mechanism, in accordance with an embodiment of the invention.
Figure 10C:
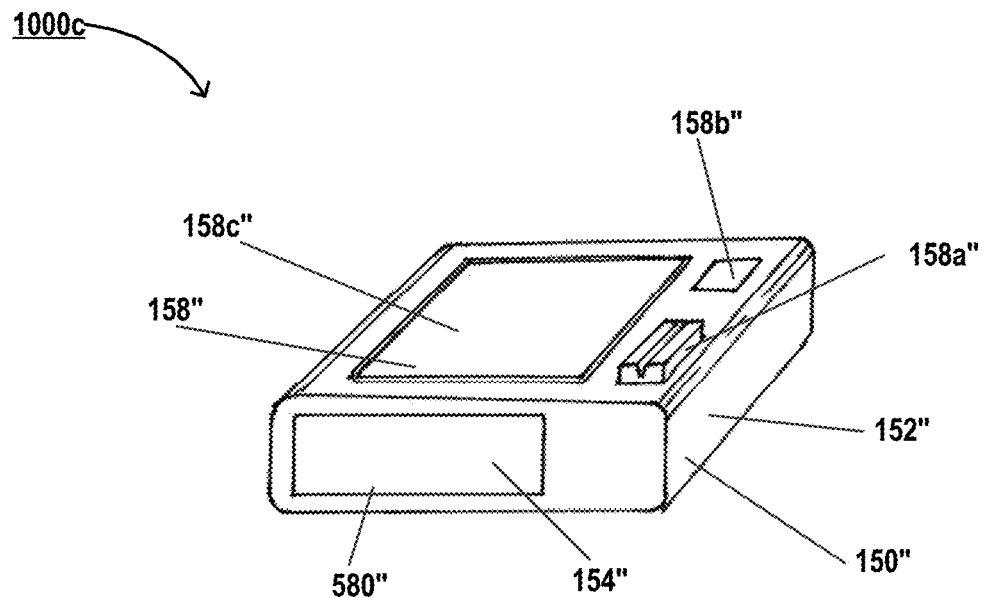
FIG. 10C illustrates a perspective view 1000*c* of a detachable item transfer mechanism, in accordance with an embodiment of the invention.

FIGS. 10B and 10C illustrate perspective views 1000*b* and 1000*c* of a detachable item transfer mechanism 150, in accordance with various embodiments of the invention. The functions and features of the detachable item transfer mechanism 150 illustrated herein are similar to those described with respect to FIGS. 2, 5 and 10A. Specifically, FIGS. 10B and 10C illustrate embodiments of the detachable item transfer mechanism (150', 150") comprising a housing (152', 152"). The housing (152', 152") is typically a rigid housing configured to withstand predetermined external stresses and strains.

The housing (152', 152") typically defines a cavity 156 (illustrated in FIGS. 11 and 12) configured to store one or more items, and an opening (154', 154") to the cavity configured to receive and/or dispense one or more items. The item transfer mechanism also typically includes a movable access cover (580', 580") or a movable cover (580', 580"), and a locking mechanism (not illustrated) that is configured to secure movable cover over the opening (154', 154"). As further illustrated, in some embodiments, the detachable item transfer mechanism (150', 150") further comprises user interface devices (158', 158"), configured for receiving authentication credentials from the user and configured for facilitating an interactive user session and execution of one or more steps of a user activity.

The user interface devices (158', 158") may comprise user authentication devices (158a', 158a") such as a biometric scanner 158a' (illustrated in FIG. 10B) configured for receiving biometric credentials of the user and a magnetic card reader 158a" (illustrated in FIG. 10B) configured for reading a magnetic card strip associated with the user. The user interface devices (158', 158") may comprise user input devices (158b', 158b") such as a keypad configured for receiving user input. The user interface devices (158', 158") may comprise user output devices (158c', 158c") such as a display screen. The display screen 158c' illustrated in FIG. 10A (e.g., a liquid crystal display, a touchscreen display, and/or the like) may also serve as an input device to receive user input. As indicated by the direction B, the display screen 158c' may be foldable to provide a contiguous outer surface to the housing 152'.

Figure 11A:
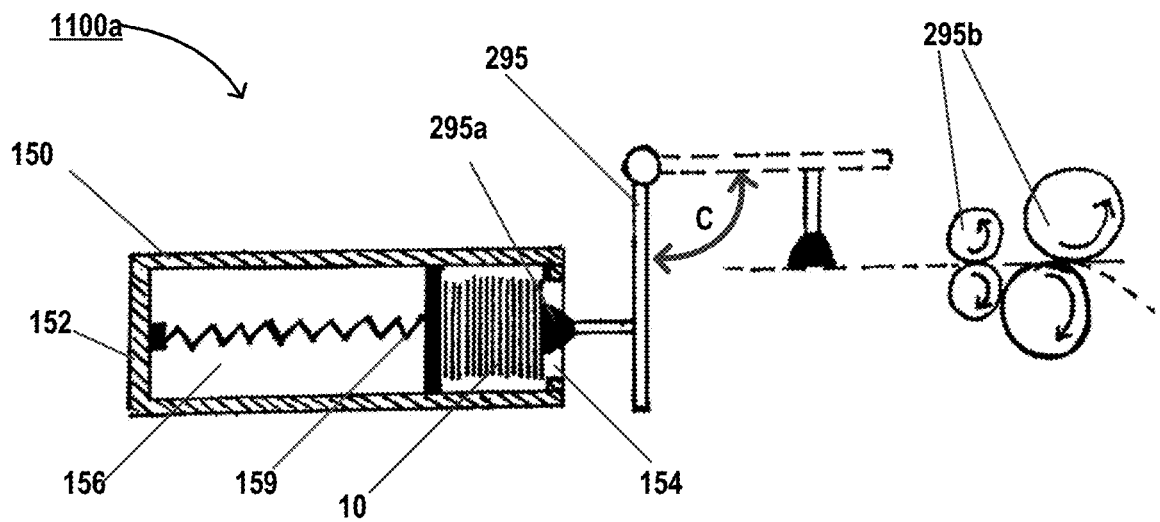
FIG. 11A illustrates a sectional view 1100*a* of a detachable item transfer mechanism environment, in accordance with an embodiment of the invention.
Figure 11B:
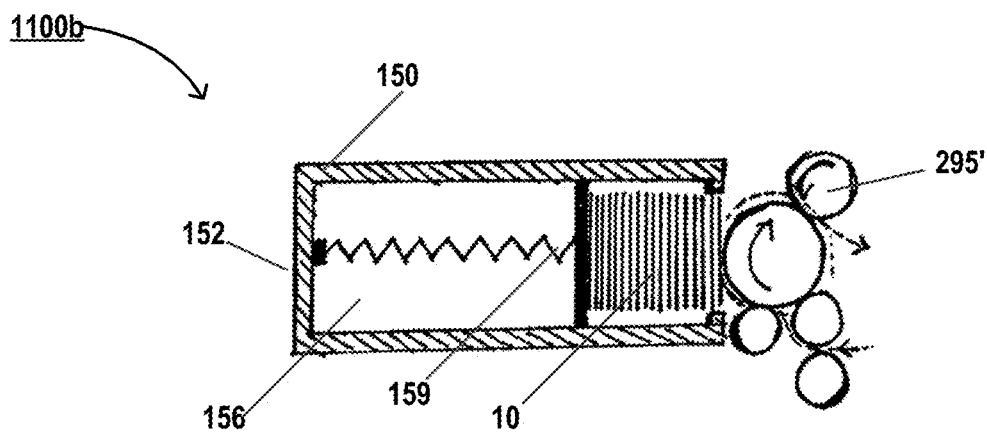
FIG. 11B illustrates a sectional view 1100*b* of a detachable item transfer mechanism environment, in accordance with an embodiment of the invention.
Figure 11C:
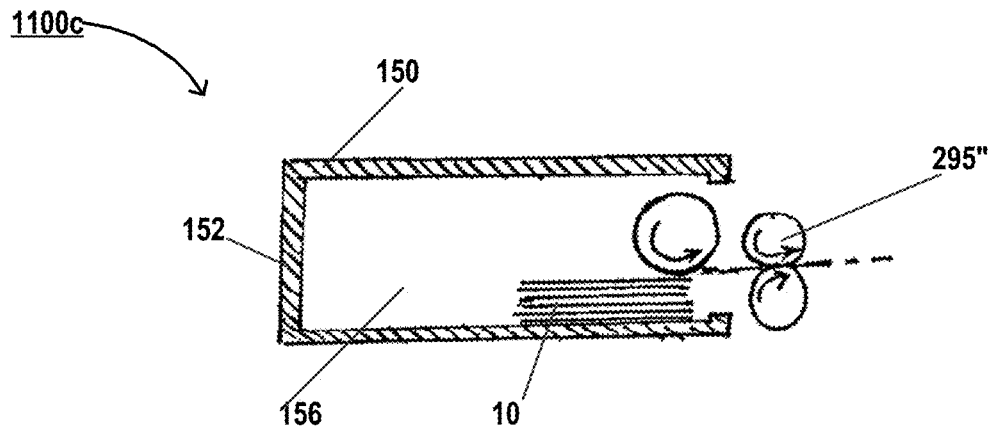
FIG. 11C illustrates a sectional view 1100*c* of a detachable item transfer mechanism environment, in accordance with an embodiment of the invention.

FIGS. 11A, 11B and 11C illustrate sectional views 1100a, 1100b and 1100c of a detachable item transfer mechanism 150 environment, in accordance with various embodiments of the invention. The functions and features of the detachable item transfer mechanism 150 illustrated herein are similar to those described with respect to FIGS. 2, 5 and 10A-C. As discussed previously, the user may place one or more items for deposit into the detachable item transfer mechanism 150, which is then retrieved by docking station 292 of the computer terminal 120. Furthermore, the docking station 292 of the terminal 120 may dispense one or more items into the detachable item transfer mechanism 150 for subsequent user retrieval. Specifically, FIGS. 11A, 11B and 11C illustrate various embodiments of the dispensing and retrieving one or more items to and from the detachable item transfer mechanism 150. Specifically, the Figures illustrate a dual insertion and retrieval mechanism (295, 295', 295") of the docking station 292, that is configured to both dispense one or more items into the detachable item transfer mechanism 150, and retrieve one or more items from the mechanism 150. FIGS. 11A to 11C illustrate mechanisms for dispensing and retrieving items 10 such as notes, checks, bills and the like. However, it is understood that the dispensing/retrieving mechanisms may vary based on the items utilized.

FIG. 11A illustrates a cutaway view of the detachable item transfer mechanism 150 comprising a housing 152, a secure cavity 156 and an opening 154. The detachable item transfer mechanism 150 further comprises an item organizing mechanism 159 configured to suitably position, orient and/or bias the one or more items 10. For example, FIGS. 11A and 11B illustrate a spring loaded item organizing mechanism 159 that is configured to position and hold the one or more items against the opening 154.

FIG. 11A illustrates a dual insertion and retrieval mechanism 295 that is configured to both dispense one or more items into the detachable item transfer mechanism 150, and retrieve one or more items from the mechanism 150. The dual insertion and retrieval mechanism 295 comprises an arm having one or more suction cups 295a. The suction cups are configured to hold one or more items by creating a predetermined vacuum between the cup and the item 10. The arm of the dual insertion and retrieval mechanism 295 is configured to swing along the direction C. The dual insertion and retrieval mechanism 295 further comprises a upstream/downstream processing mechanism 295b. The operation of the dual insertion and retrieval mechanism 295 will now be described. Typically, the movable access cover 580 (illustrated in FIG. 5) is configured to be unlocked and placed in an open position, when the detachable item transfer mechanism 150 is inserted into the docking station 292. In some embodiments, the microprocessor 510 (illustrated in FIG. 5), automatically, unlocks the cover 580, based on determining that the detachable item transfer mechanism 150 is secured in the docking station. In some embodiments, the microprocessor 510 unlocks the cover 580, in response to receiving an instruction from the system, (i.e., the computer terminal) such that access is granted to the secure cavity 156.

For dispensing an item, the upstream processing mechanism 295b may position an item proximate the suction cup 295a such that the item temperately adheres to the suction cup 295a. Next, the arm of the dual insertion and retrieval mechanism 295 rotates in clockwise direction such that the suction cup 295a having the item proximate the opening 154 of the detachable item transfer mechanism 150. The suction cup along with the arm is configured to provide a force sufficient against the organizing mechanism to place/dispense the item into the secure cavity 156. The vacuum of the suction cup is then released to dispense the item. The system may place the required number of items in a similar manner, and then cause the cover 580 to be closed and locked over the opening 154. The user may then retrieve and unlock the detachable item transfer mechanism 150 to retrieve the placed items, and/or dispense other items into the secure cavity 156, after requisite authentication.

For retrieving an item, the detachable item transfer mechanism 150 is typically placed into the docking station 292, causing the opening of the cover 580. Next, the arm of the dual insertion and retrieval mechanism 295 is positioned such that the suction cup 295a is proximate an item at the opening 154 of the detachable item transfer mechanism 150. The item may then adhere to the suction cup 295a. Subsequently, the arm is rotated in the counter-clockwise direction to deliver the item to downstream processing 295b. Other items may be retrieved in a similar manner.

FIG. 11B is substantially similar to the embodiment described with respect to FIG. 11A, except that the dual insertion and retrieval mechanism 295' employs a roller mechanism to dispense one or more items into the detachable item transfer mechanism 150, and retrieve one or more items from the mechanism 150. The roller mechanism holds the item by the virtue of application of pressure. FIG. 11C is substantially similar to the embodiment described with respect to FIG. 11B, having a roller mechanism based dual insertion and retrieval mechanism 295" to dispense one or more items into the detachable item transfer mechanism 150, and retrieve one or more items from the mechanism 150. However, the detachable item transfer mechanism 150 does not comprise the organized mechanism, and the items 10 are oriented differently in comparison with the items in the previous embodiments.

Figure 12A:
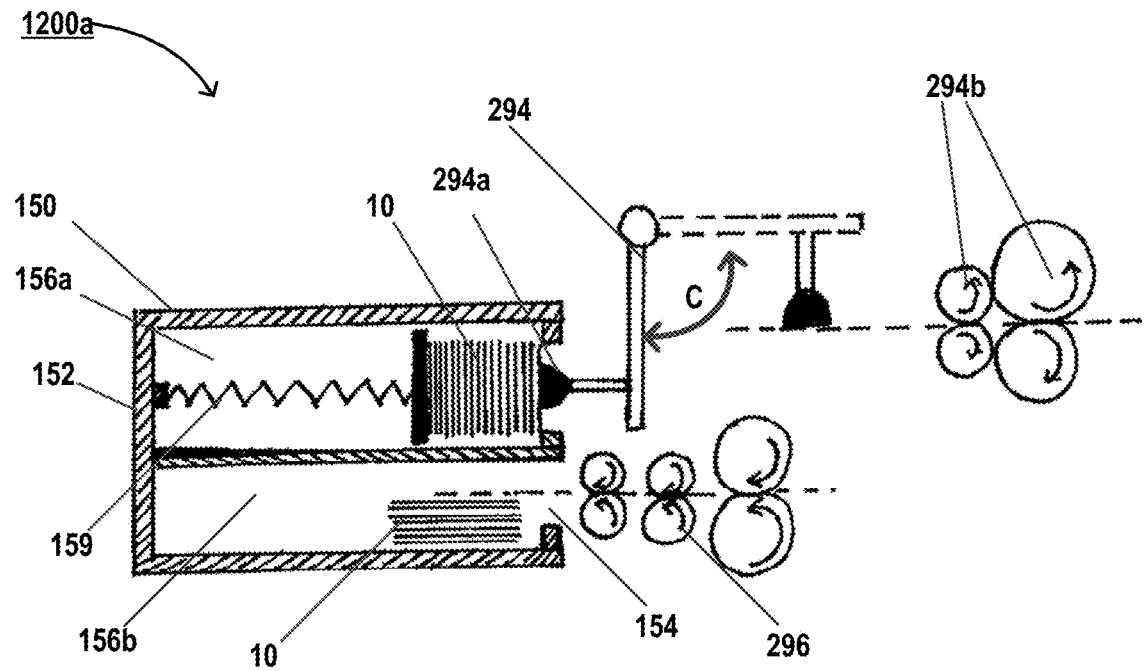
FIG. 12A illustrates a sectional view 1200*a* of a detachable item transfer mechanism environment, in accordance with an embodiment of the invention.
Figure 12B:
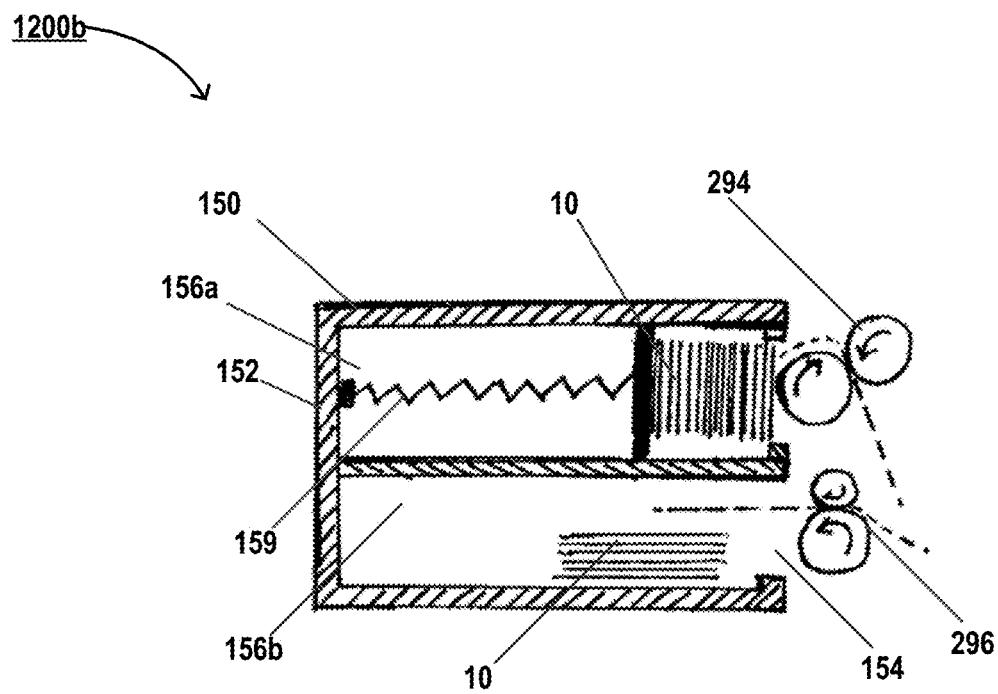
FIG. 12B illustrates a sectional view 1200*b* of a detachable item transfer mechanism environment, in accordance with an embodiment of the invention.

FIGS. 12A and 12B illustrate sectional views 1200a and 1200b of a detachable item transfer mechanism 150 environment, in accordance with other embodiments of the invention. The functions and features of the detachable item transfer mechanism 150 illustrated herein are similar to those described with respect to FIGS. 11A to 11C. However, the FIGS. 12A and 12B illustrate the detachable item transfer mechanism 150 with a first secure cavity 156a for the system to dispense items into using a dispensing mechanism 294 and a second secure cavity 156b for the system to retrieve items placed by the user using a retrieval mechanism 296. Specifically, FIG. 12A illustrates a suction cup dispensing mechanism 294 comprising a suction cup 294a, as arm and an upstream processing mechanism 294a, similar to the mechanism 295 described previously. FIG. 12A further illustrates a roller based retrieval mechanism for retrieving items placed by the user in the second secure cavity 156b. FIG. 12B is similar to the embodiment described with respect to FIG. 12A, except that in this embodiment, both the dispensing mechanism 294 and the retrieval mechanism 296 are roller based. In some instances, the insertion and/or retrieval mechanisms may be provided within the detachable item transfer mechanism 150. Furthermore, in some instances, the detachable item transfer mechanism 150, for example using an insertion mechanism of the mechanism 150, may be configured to determine the number, type, and/or other information associated with the items being inserted into and or retrieved from the detachable item transfer mechanism 150.

Figure 13:
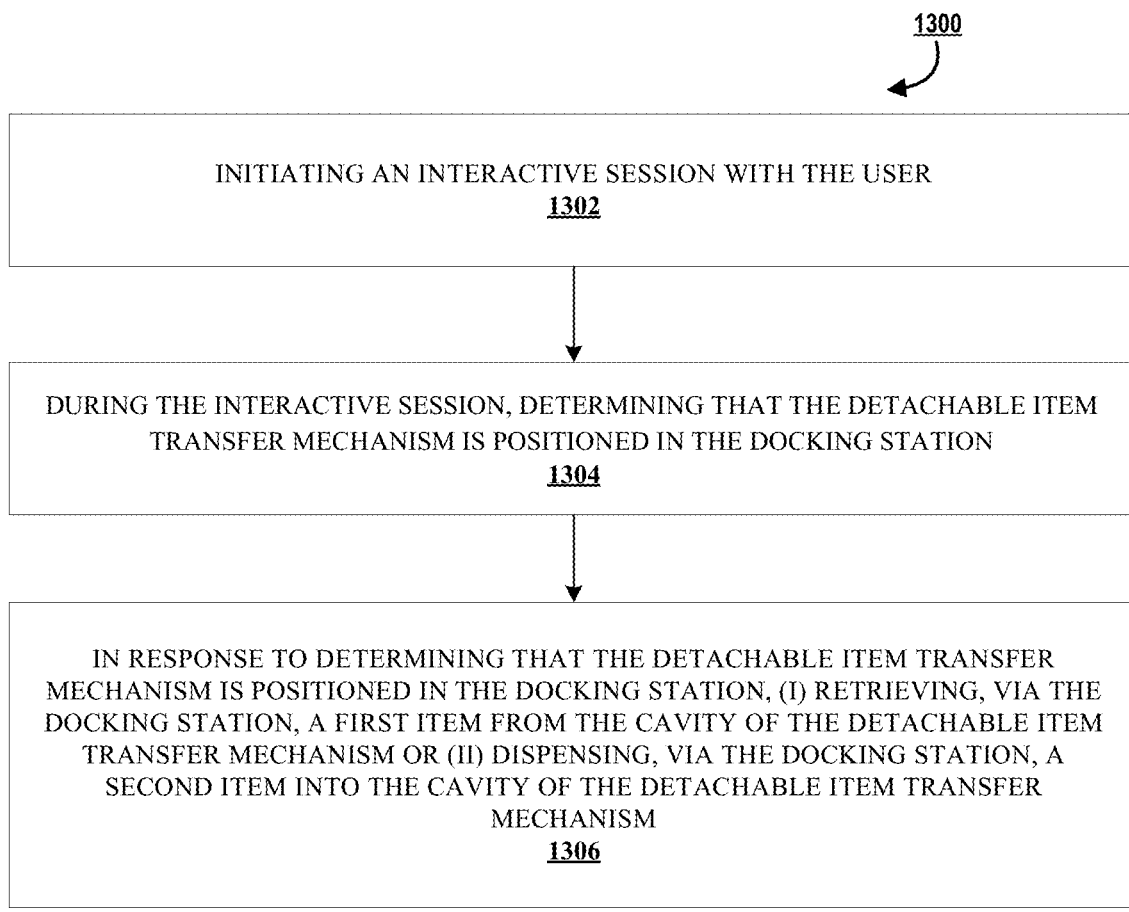
FIG. 13 illustrates a high level process flow 1300 for providing a secure interactive session to a user at a computer terminal, in accordance with an embodiment of the invention.

Referring now to FIG. 13, illustrating a high level process flow 1300 for providing a secure interactive session to a user at a computer terminal using a detachable item transfer mechanism 150. As discussed previously, the detachable item transfer mechanism 150 comprises a housing enclosing a secure cavity and an opening to the cavity. The mechanism 150 further comprises a movable cover movably attached to the housing, the movable cover being movable between a closed position and an open position. Furthermore, the movable cover is configured to cover the opening to the cavity when the movable cover is in the closed position. In addition, the detachable item transfer mechanism 150 comprises a locking mechanism configured to engage the movable cover to thereby secure the movable cover in the closed position. The locking mechanism is further configured to disengage the movable cover to thereby permit the movable cover to be moved to the open position in response to (i) a user providing authentication credentials or (ii) receiving an unlock command from the computer terminal.

At first, the system initiates an interactive session with the user, as indicated by block 1302. The system may receive an indication from the user, typically accompanying user authentication credentials, seeking initiation of the interactive session via the user device 104, for example, via the computer terminal 120. In some instances, the system receives a request for initiating an interactive session from an interface associated with the user device 104 in communication with the computer terminal 120, such as a user mobile device and/or a computer device associated with the vehicle 108. In response to receiving the request from the user device (such as the user mobile device, or the computer device of the vehicle 108), the system is configured to establish a secure communication channel with the user device. The system may further initiate an interactive session via the interface of the user device. During the interactive session, the system is configured to receive an interactive command or another form of user input (such as, withdrawal of cash) over the secure communication channel from the user device (such as the user mobile device, or the computer device of the vehicle 108), and based on successful validation of the received user authentication credentials, proceed with the performance of one or more user activities accordingly (i.e., dispense the requisite cash into the detachable item transfer mechanism 150 as described below).

Next, at block 1304, during the interactive session, the system determines that the detachable item transfer mechanism is positioned in the docking station. In response to determining that the detachable item transfer mechanism is positioned in the docking station, the system proceeds to (i) retrieve, via the docking station, a first item from the cavity of the detachable item transfer mechanism or (ii) dispense, via the docking station, a second item into the cavity of the detachable item transfer mechanism, as indicated by block 1306. Typically, the retrieving and dispensing activities are performed in accordance with the user activities.

Subsequently, the user may withdraw the detachable item transfer mechanism 150 from the docking station 292, to place items into or withdraw items from the mechanism 150. In some embodiments, the docking station comprises a docking station locking mechanism configured to prevent unauthorized access or retrieval of the detachable item transfer mechanism 150 from the docking station. For example, the docking station may comprise one or more of mechanical locking mechanisms, magnetic locking mechanisms, access doors and the like, that are required to be unlocked/disengaged for the user to access and/or remove the detachable item transfer mechanism 150 from the terminal 120. Here, the system may require successful validation of first authentication credentials received from the user (for example, the user authentication credentials received previously or other authentication credentials) to authorize retrieval of the detachable item transfer mechanism 150 from the terminal 120. In response to the successful validation of the first authentication credentials, the system may cause the docking station locking mechanism to be unlocked/disengaged for a predetermined time period, to allow the user to remove the detachable item transfer mechanism 150 from the terminal 120 within the predetermined time period.

After removal of the detachable item transfer mechanism 150 from the terminal 120, second authentication credentials are typically required for the user to unlock the cover of the detachable item transfer mechanism 150 itself, to gain access to the cavity of the detachable item transfer mechanism 150. These second authentication credentials may be provided by the user on the detachable item transfer mechanism 150, the user device 104, computer devices of the user vehicle, and/or the like. These credentials themselves, and/or notification of successful/unsuccessful validation may then be transmitted to the detachable item transfer mechanism 150, the terminal 120 and/or the processing devices 130, which may in turn cause the opening of the cover. For example, in some embodiments, the detachable item transfer mechanism 150 is configured to present its own authentication interface, such as a second communication interface, to receive second authentication credentials from the user. The computer terminal is configured for establishing, via the communication interface, a secure communication channel with the second communication interface of the detachable item transfer mechanism. Based on successful authentication of the user, the computer terminal is configured to transmit the unlock command over the secure communication to the detachable item transfer mechanism to cause the cover to be unlocked.

Moreover, the system is also configured to present a graphical user interface typically comprising data associated with the one or more parameters of the environment, on a display associated with the detachable item transfer mechanism 150 and/or the user device interface, as described in detail with respect to FIG. 8. As discussed, in some instances, the sensors are configured to monitor a first parameter of the one or more environmental parameters. The system may then display the data associated with the first parameter on the graphical user interface, for example, the environment interface 820 on the user device (such as the user mobile device, or the computer device of the vehicle 108). As such, the graphical user interface comprises real-time data associated with the one or more parameters of the environment. Furthermore, the system is also configured to alert the user via the graphical user interface in the event of an environmental trigger (for example, a predetermined incident in the locality or the vicinity of the terminal, an individual located near the terminal for a predetermined period of time, and the like). The system may alert the user and one or more other systems or authorities, before, after and/or during the user activity. For example, based on determining that an environmental condition exists, the system may display an indicator that the environmental condition exists on the graphical user interface (for example, within the environment interface 820 of the graphic user interface 800). Furthermore, the system is configured for displaying a diagram of at least a portion of the environment adjacent to the computer terminal on the graphical user interface, as indicated by the top-down diagram of the terminal environment 824 of FIG. 8.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. Patent Application Ser. No. | Title | Filed On |
|---|---|---|
| 15/365,424, now U.S. Pat. No. 9,898,901 | PHYSICAL SECURITY SYSTEM FOR COMPUTER TERMINALS | Concurrently herewith |
| 15/365,436, now U.S. Pat. No. 10,341,854 | CREATING A SECURE PHYSICAL CONNECTION BETWEEN A COMPUTER TERMINAL AND A VEHICLE | Concurrently herewith |

What is claimed is:

1. A computer terminal located in an environment, comprising:
 a display;
 a detachable item transfer mechanism comprising:
  a housing, the housing defining a cavity and an opening to the cavity;
  a movable cover movably attached to the housing, the movable cover being movable between a closed position and an open position, the movable cover being configured to cover the opening to the cavity when the movable cover is in the closed position; and
  a locking mechanism, the locking mechanism being configured to engage the movable cover to thereby secure the movable cover in the closed position, the locking mechanism being further configured to disengage the movable cover to thereby permit the movable cover to be moved to the open position in response to (i) a user providing authentication credentials or (ii) receiving an unlock command from the computer terminal;
 a docking station configured for receiving the detachable item transfer mechanism;
 a memory;
 a communication interface;
 a processor; and
 a terminal application stored in the memory, executable by the processor, and configured for:
  initiating an interactive session with the user;
  during the interactive session, determining that the detachable item transfer mechanism is positioned in the docking station; and
  in response to determining that the detachable item transfer mechanism is positioned in the docking station, (i) retrieving, via the docking station, a first item from the cavity of the detachable item transfer mechanism or (ii) dispensing, via the docking station, a second item into the cavity of the detachable item transfer mechanism.

2. The computer terminal according to claim 1, wherein the terminal application is configured for:
 receiving a request from a mobile device of the user to initiate the interactive session;
 in response to receiving the request from the mobile device, establishing, via the communication interface, a secure communication channel with the mobile device and initiating the interactive session;
 during the interactive session, receiving an interactive command over the secure communication channel from the mobile device; and
 in response to receiving the interactive command over the secure communication channel from the mobile device, completing one or more activities.

3. The computer terminal according to claim 2, wherein the terminal application is configured for:
 monitoring one or more parameters of the environment; and
 transmitting data associated with the one or more parameters of the environment to the mobile device over the secure communication channel.

4. The computer terminal according to claim 1, wherein the terminal application is configured for:
 receiving a request from a computer system of the vehicle to initiate the interactive session;
 in response to receiving the request from the computer system of the vehicle, establishing, via the communication interface, a secure communication channel with the computer system of the vehicle and initiating the interactive session;
 during the interactive session, receiving an interactive command over the secure communication channel from the computer system of the vehicle; and
 in response to receiving the interactive command over the secure communication channel from the computer system of the vehicle, completing one or more activities.

5. The computer terminal according to claim 4, wherein the terminal application is configured for:
 monitoring one or more parameters of the environment; and
 transmitting data associated with the one or more parameters of the environment to the computer system of the vehicle over the secure communication channel.

6. The computer terminal according to claim 1, wherein the detachable item transfer mechanism comprises a user interface, the detachable item transfer mechanism being configured to receive the authentication credentials from the user via the user interface.

7. The computer terminal according to claim 6, wherein:
 the detachable item transfer mechanism comprises a second communication interface, the user interface being configured to receive interactive commands from the user;
 wherein the terminal application is configured for:
  establishing, via the communication interface, a secure communication channel with the second communication interface of the detachable item transfer mechanism;
  receiving an interactive command over the secure communication channel from the detachable item transfer mechanism; and
  in response to receiving the interactive command over the secure communication channel from the detachable item transfer mechanism, completing one or more activities.

8. The computer terminal according to claim 7, wherein completing the one or more activities comprises initiating the interactive session.

9. The computer terminal according to claim 7, wherein the user interface of the detachable item transfer mechanism comprises a second display, the detachable item transfer mechanism being configured to display session information on the second display during the interactive session.

10. The computer terminal according to claim 9, wherein:
 the terminal application is configured for:

monitoring one or more parameters of the environment; and transmitting data associated with the one or more parameters of the environment to the detachable item transfer mechanism over the secure communication channel; and the detachable item transfer mechanism is configured to display the data associated with the one or more parameters of the environment on the second display.

11. The computer terminal according to claim 10, comprising one or more sensors for monitoring the one or more parameters of the environment.

12. The computer terminal according to claim 1, wherein:

the detachable item transfer mechanism comprises a second communication interface;

wherein the terminal application is configured for:

establishing, via the communication interface, a secure communication channel with the second communication interface of the detachable item transfer mechanism; and transmitting the unlock command over the secure communication to the detachable item transfer mechanism.

13. The computer terminal according to claim 1, wherein the docking station is configured for dispensing one or more items into the cavity of detachable item transfer mechanism.

14. The computer terminal according to claim 1, wherein the docking station is configured for retrieving one or more items from the cavity of the detachable item transfer mechanism.

15. The computer terminal according to claim 1, wherein the computer terminal is an automated teller machine.

16. A method for providing a detachable item transfer mechanism for dispensing and collecting items at a computer terminal, the method comprising:

providing the computer terminal, the computer terminal comprising:

a display;

a detachable item transfer mechanism comprising:

a housing, the housing defining a cavity and an opening to the cavity;

a movable cover movably attached to the housing, the movable cover being movable between a closed position and an open position, the movable cover being configured to cover the opening to the cavity when the movable cover is in the closed position; and a locking mechanism, the locking mechanism being configured to engage the movable cover to thereby secure the movable cover in the closed position, the locking mechanism being further configured to disengage the movable cover to thereby permit the movable cover to be moved to the open position in response to (i) a user providing authentication credentials or (ii) receiving an unlock command from the computer terminal; and a docking station configured for receiving the detachable item transfer mechanism;

initiating an interactive session with the user;

during the interactive session, determining that the detachable item transfer mechanism is positioned in the docking station; and in response to determining that the detachable item transfer mechanism is positioned in the docking station, (i) retrieving, via the docking station, a first item from the cavity of the detachable item transfer mechanism or (ii) dispensing, via the docking station, a second item into the cavity of the detachable item transfer mechanism.

17. The method according to claim 16, wherein the method further comprises:

receiving a request from a mobile device of the user to initiate the interactive session;

in response to receiving the request from the mobile device, establishing, via the communication interface, a secure communication channel with the mobile device and initiating the interactive session;

during the interactive session, receiving an interactive command over the secure communication channel from the mobile device; and in response to receiving the interactive command over the secure communication channel from the mobile device, completing one or more activities.

18. The method according to claim 17, wherein the method further comprises:

monitoring one or more parameters of the environment; and transmitting data associated with the one or more parameters of the environment to the mobile device over the secure communication channel.

19. The method according to claim 16, wherein the method further comprises:

receiving a request from a computer system of the vehicle to initiate the interactive session;

in response to receiving the request from the computer system of the vehicle, establishing, via the communication interface, a secure communication channel with the computer system of the vehicle and initiating the interactive session;

during the interactive session, receiving an interactive command over the secure communication channel from the computer system of the vehicle; and in response to receiving the interactive command over the secure communication channel from the computer system of the vehicle, completing one or more activities.

20. The method according to claim 19, wherein the method further comprises:

monitoring one or more parameters of the environment; and transmitting data associated with the one or more parameters of the environment to the computer system of the vehicle over the secure communication channel.

* * * * *